US010271227B2

(12) United States Patent
Singh et al.

(10) Patent No.: US 10,271,227 B2
(45) Date of Patent: Apr. 23, 2019

(54) ENHANCED NEIGHBOR RELATIONS AND PHYSICAL CELL IDENTIFIER CONFUSION DETECTION

(71) Applicant: QUALCOMM Incorporated, San Diego, CA (US)

(72) Inventors: Damanjit Singh, San Diego, CA (US); Chirag Patel, San Diego, CA (US); Manu Sharma, Mountain View, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/492,510

(22) Filed: Apr. 20, 2017

(65) Prior Publication Data

US 2017/0359737 A1 Dec. 14, 2017

Related U.S. Application Data

(60) Provisional application No. 62/349,620, filed on Jun. 13, 2016.

(51) Int. Cl.
*H04W 24/02* (2009.01)
*H04W 16/14* (2009.01)
(Continued)

(52) U.S. Cl.
CPC ........... *H04W 24/02* (2013.01); *H04W 16/14* (2013.01); *H04W 36/0061* (2013.01); *H04W 88/08* (2013.01)

(58) Field of Classification Search
CPC .......................... H04W 88/085; H04W 88/02
(Continued)

(56) References Cited

U.S. PATENT DOCUMENTS

2008/0207207 A1 8/2008 Moe et al.
2009/0170472 A1* 7/2009 Chapin ................. H04W 28/18
455/410
(Continued)

FOREIGN PATENT DOCUMENTS

WO WO-2009088332 A1 7/2009
WO WO-2016123568 A1 8/2016

OTHER PUBLICATIONS

ISA/EP, International Search Report and Written Opinion of the International Searching Authority, Int'l Application No. PCT/US2017/035721, dated Sep. 13, 2017, European Patent Office, Rijswijk, NL, 14 pgs.

*Primary Examiner* — Kiet M Doan
(74) *Attorney, Agent, or Firm* — Linda G. Gunderson; Holland & Hart

(57) ABSTRACT

Methods, systems, and devices for enhanced neighbor discovery through enhanced automatic neighbor relations (ANR) and for detecting cell identifier confusion and are described. Neighboring base stations may provide information to one another, including using ANR, that may avoid or help to resolve cell identity confusion. For example, a NHN-ID may be defined to avoid or resolve cell identify confusion. A wireless device, such as a base station or a user equipment (UE), may determine whether neighboring cells are using a common cell identifier and may adjust operations accordingly. For example, a device may detect physical cell identity (PCI) confusion by determining whether two neighboring cells have the same PCI and different Evolved Universal Terrestrial Access Network (E-UTRAN) Cell Global Identifiers (ECGIs) or different Neutral Host Network Identifier (NHN-IDs). A network entity may then inform the neighboring cells having the same PCI of the confusion.

23 Claims, 17 Drawing Sheets

(51) Int. Cl.
*H04W 36/00* (2009.01)
*H04W 88/08* (2009.01)

(58) Field of Classification Search
USPC ........ 370/328, 236, 331, 329, 350; 455/454,
455/450, 456.1, 410, 501, 442
See application file for complete search history.

(56) References Cited

U.S. PATENT DOCUMENTS

2010/0317351 A1    12/2010  Gerstenberger et al.
2011/0021205 A1*   1/2011   Horneman ............ H04W 76/10
                                                455/450
2011/0274097 A1    11/2011  Zhang et al.
2014/0016583 A1*   1/2014   Smith .................. H04W 12/06
                                                370/329
2015/0281974 A1*   10/2015  Ghasemzadeh ....... H04W 16/14
                                                455/454
2015/0341839 A1*   11/2015  Kim ..................... H04W 36/22
                                                370/331
2016/0094999 A1*   3/2016   Yu ........................ H04W 16/14
                                                455/454
2016/0100331 A1    4/2016   Ahmavaara et al.

\* cited by examiner

ENHANCED NEIGHBOR RELATIONS AND PHYSICAL CELL IDENTIFIER CONFUSION DETECTION

CROSS REFERENCES

The present application for patent claims priority to U.S. Provisional Patent Application No. 62/349,620, entitled "Enhanced neighbor Relations and Physical Cell Identifier Confusion Detection," filed Jun. 13, 2016, assigned to the assignee hereof.

BACKGROUND

The following relates generally to wireless communication and more specifically to enhanced neighbor relations and cell identifier confusion detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Some wireless systems may operate in shared or unlicensed spectrum where medium access is unscheduled and may be determined according to contention-based procedures. In these types of systems, neighboring base stations may lack information about one another, and those base stations may communicate in an uncoordinated manner. If base stations or UEs do not account for possible confusion or uncoordinated communication between and among base stations, system efficiency and mobility with these base stations may suffer.

SUMMARY

The described techniques relate to improved methods, systems, devices, or apparatuses that support enhanced neighbor relations and physical cell identifier (PCI) confusion detection.

A wireless device, such as a base station or a user equipment (UE), may detect PCI confusion by determining whether two neighboring cells have the same PCI but different Evolved Universal Terrestrial Access Network (E-UTRAN) Cell Global Identifiers (ECGIs). In some cases, if both the ECGI and the PCI for two neighboring cells are the same, PCI confusion may be detected based on a Neutral Host Network (NHN) Identifier (NHN-ID) associated with each of the two neighboring cells.

The NHN-ID or the ECGI may be communicated in a Neighbor Relations Table (NRT) from one base station to another (either directly or indirectly through another network entity) using a backhaul link (e.g., an X2 interface). In some cases, the NHN-ID or the ECGI may be determined by a UE in the wireless communications system and reported to a base station. In another example, information relating to the NHN-ID or the ECGI of a base station may be communicated by the base station. For example, the NHN-ID or the ECGI may be contained within system information (SI) (e.g., in an SI block (SIB) or enhanced SIB (eSIB)), which may be transmitted in a broadcast message by a base station. A receiving device, such as a UE or another base station, may decode the broadcast message to obtain the NHN-ID or the ECGI.

Once PCI confusion or a potential for PCI confusion is detected, a base station may change its PCI in order to avoid confusion experienced by a neighboring cell. In some cases, a base station, a UE, or another network entity may inform one or more of the neighboring cells having the same PCI of the confusion and request that at least one of the neighboring cells change their corresponding PCI.

A method of wireless communication is described. The method may include determining a cell identifier and a NHN-ID for a first base station that is operating in a first NHN in a shared radio frequency spectrum band and transmitting the cell identifier and the NHN ID to a second base station that is operating in the first NHN or a second NHN in the shared radio frequency spectrum band.

An apparatus for wireless communication is described. The apparatus may include means for determining a cell identifier and a NHN-ID for a first base station that is operating in a first NHN in a shared radio frequency spectrum band and means for transmitting the cell identifier and the NHN ID to a second base station that is operating in the first NHN or a second NHN in the shared radio frequency spectrum band.

Another apparatus for wireless communication is described. The apparatus may include a processor, memory in electronic communication with the processor, and instructions stored in the memory. The instructions may be operable to by the processor to cause the apparatus to determine a cell identifier and a NHN-ID for a first base station that is operating in a first NHN in a shared radio frequency spectrum band and transmit the cell identifier and the NHN ID to a second base station that is operating in the first NHN or a second NHN in the shared radio frequency spectrum band.

A non-transitory computer readable medium for wireless communication is described. The non-transitory computer-readable medium may include instructions operable to cause a processor to determine a cell identifier and a NHN-ID for a first base station that is operating in a first NHN in a shared radio frequency spectrum band and transmit the cell identifier and the NHN ID to a second base station that is operating in the first NHN or a second NHN in the shared radio frequency spectrum band.

Some examples of the method, apparatus, and non-transitory computer-readable medium described above may further include processes, features, means, or instructions for receiving, from the second base station, a request to read and report system information for a PCI, wherein transmitting the cell identifier and the NHN ID is based at least in part on the request.

In some examples of the method, apparatus, and non-transitory computer-readable medium described above, the cell identifier comprises an ECGI or the PCI for the first base station.

In some examples of the method, apparatus, and non-transitory computer-readable medium described above, the request comprises a list of known cell identifiers for one or more base stations.

In some examples of the method, apparatus, and non-transitory computer-readable medium described above, the request comprises an indication to report newly detected cell identifiers.

Some examples of the method, apparatus, and non-transitory computer-readable medium described above may further include processes, features, means, or instructions for identifying a radio access technology (RAT) used by the first base station. Some examples of the method, apparatus, and non-transitory computer-readable medium described above may further include processes, features, means, or instructions for transmitting an indication of the RAT used by the first base station to the second base station.

Some examples of the method, apparatus, and non-transitory computer-readable medium described above may further include processes, features, means, or instructions for receiving, at a UE, a request to report information associated with one or more cell identifiers. Some examples of the method, apparatus, and non-transitory computer-readable medium described above may further include processes, features, means, or instructions for transmitting, in response to the request, at least one of a PC), an ECGI, or a NHN-ID associated with the one or more cell identifiers.

In some examples of the method, apparatus, and non-transitory computer-readable medium described above, transmitting the cell identifier and the NHN ID to a second base station further comprises: transmitting, by a third base station, the cell identifier and the NHN-ID to the second base station via an X2 interface, wherein the cell identifier comprises at least one of a PCI or an ECGI for the first base station.

DETAILED DESCRIPTION

Figure 1:
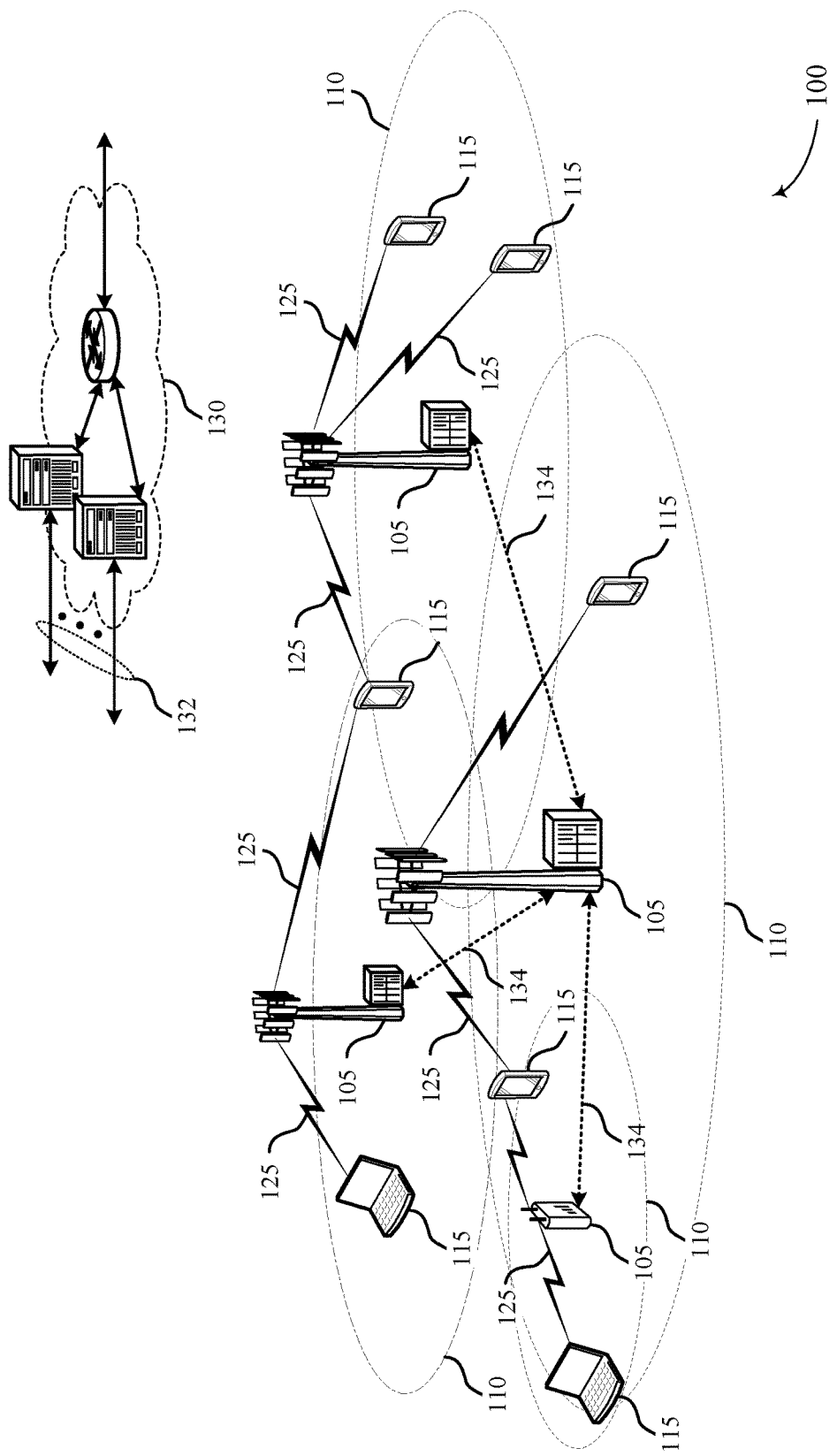
FIG. 1 illustrates an example of a system for wireless communication that supports enhanced neighbor relations and physical cell identifier (PCI) confusion detection in accordance with various aspects of the present disclosure.

Some wireless communications systems may utilize a shared radio frequency spectrum band and in such systems, two (or more) individual base stations (or cells) may select and use the same physical cell identifier (PCI). If two cells with the same PCI are near each other (e.g., having a common neighboring cell), the common neighboring cell operating in the system may be unable to distinguish between the two individual cells by using user equipment (UE) reports that include PCI. Due to the confusion, which may be referred to as PCI confusion, UEs served by the common neighboring cell may experience handover failures, or performance degradation, among other detrimental effects.

Detecting neighboring cells that may cause PCI confusion may reduce the occurrence of the aforementioned issues and may also lead to more successful handovers from a serving base station to a target base station. To detect whether PCI confusion exists in a wireless communications system, a base station may compare information in one neighbor relations table (NRT) with information of itself or in a second NRT (e.g., from a neighboring base station). The comparison may be used to determine if two PCIs (one in each NRT or one in a NRT and one the base station is currently using) are equivalent but have different Evolved Universal Terrestrial Access Network (E-UTRAN) Cell Global Identifiers (ECGIs). In some cases, the second NRT or other identifying information (such as PCIs or ECGIs) of neighboring cells may be exchanged between base stations using a backhaul communication link (e.g., an X2 interface).

By way of example, a base station may determine that PCI A corresponds with ECGI A in a NRT associated with the base station. Alternatively, the base station itself may determine that it is using PCI A and ECGI A. The base station may receive a second NRT (or other identifying information) from a another base station and determine that PCI A is also in the second NRT, but corresponds with ECGI B, which is different than ECGI A. As the ECGIs differ between the two NRTs for PCI A, the base station may determine that the same PCI (i.e., PCI A) is used to identify two distinct cells.

In a Neutral Host Network (NHN), each base station within the NHN may be associated with a NHN identifier (NHN-ID) indicating information relating to the NHN that the base station is part of. The NHN-ID may be communicated between base stations (e.g., in a NRT, or separately over an X2 interface). In conjunction with the PCI and/or the ECGI, a base station may use the NHN-ID to identify whether two neighboring cells share the same identifying information (such as cell identifiers: PCI, ECGI, NHN-ID, etc.), which may lead to PCI confusion.

In some examples, a UE may be configured to obtain an ECGI or a NHN-ID, or both, associated with a cell (e.g., by reading a system information block (SIB), SIB1, or enhanced SIB (eSIB)) and report the ECGI or NHN-ID (e.g., periodically or event-based in a radio resource control (RRC) connection reconfiguration). If multiple ECGIs or NHN-IDs are reported for a single PCI, PCI confusion may be detected.

During a handover procedure, a serving station may transmit a handover (HO) command message to a UE. The HO command message may include PCI, ECGI, NHN-ID, or other identifying information of the target cell. If HO fails, the UE may then read the target cell identifiers (e.g., PCI, ECGI, or NHN-ID) to determine whether HO failed due to PCI confusion between the failed cell and the target cell. For example, if the PCI associated with the target cell is equivalent to the PCI associated with the failed cell, and the ECGI or the NHN-ID differs between the target and failed cells, the UE may determine that HO failed due to PCI confusion.

Aspects of the disclosure introduced above are described below in the context of a wireless communications system. Aspects of the disclosure are further illustrated by and described with reference to apparatus diagrams, system diagrams, and flowcharts that relate to enhanced neighbor relations and PCI confusion detection.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network. In the wireless communications system 100, base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105. Base stations 105 may exchange information (e.g., cell identification information) with one another using automatic neighbor relations (ANR) when a base station 105 is added to the system 100. Or base stations 105 may periodically exchange information with one another when a base station 105 is upgrade or updated with new software, to support new versions of a communication standard, or the like. Base stations 105 may share information about one adjacent neighbor with another adjacent neighbor so that many or all base stations 105 within system 100 have information about one another.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ listen before talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD or a combination of both.

A UE 115 may use a discovery reference signal (DRS) transmitted by a base station 105 to perform measurements on a cell associated with the base station 105. A DRS may include synchronization signals, cell specific reference signals, a master information block (MIB) and other signaling useful for identifying or attaching to a cell. A base station 105 may transmit DRS during periodically configured DRS transmission windows (DTxWs). A UE may measure cell DRS according to periodically configured DRS measurement timing configuration (DMTC) periods. The DMTC may be configured for measurements of a serving cell or neighbor cells, or both. Further, the DMTC may be frequency specific or may be applicable multiple frequencies in various examples. For example, a DTxW may be configured to have a 160 ms periodicity and a duration of 1 ms to 10 ms.

DRS may include primary and secondary synchronization signals to enable a UE 115 to identify the timing and frequency range of a cell. After completing initial cell synchronization, a UE 115 may decode the MIB. The MIB carries a few important pieces of information for UE initial access, including: DL channel bandwidth in term of resource blocks (RBs), physical hybrid automatic repeat request (HARD) indicator channel (PHICH) configuration (duration and resource assignment), and system frame number (SFN). After receiving the MIB, a UE may receive one or more system information blocks (SIBs). Different SIBs may be defined according to the type of system information (SI) conveyed and they may be defined for licensed frequency operation or unlicensed frequency operation, or both. In some examples, certain SIBs may be used by UEs 115 operating under a MuLTEFire scheme within wireless communications system 100, while other SIBs may be used by UEs 115 operating on licensed frequencies. In some cases, the periodicity and configuration of MIB and SIBs may be different for cells operating in licensed and unlicensed spectrum.

For UEs 115 operating on unlicensed frequencies, including those operating in MuLTEFire portions of wireless communications system 100, the UE 115 may decode an enhanced SIB (eSIB). The eSIB may be broadcast (e.g., on a physical broadcast channel (PBCH)) and may include system information equivalent to some fields or information included in other SIBs. For example, the eSIB may include information that may also be conveyed in SIB1 and SIB2 in licensed frequency operation, as described above. In some cases, the eSIB may include an indication of subframe configurations including, for example, whether certain subframes are multimedia broadcast single frequency network (MBSFN) subframes. The eSIB may support unlicensed operation because it may quickly provide information (e.g., frame-type or subframe configuration) to a UE 115 after cell acquisition.

System information, including the system information provided in a SIB or eSIB, may include identification information about a cell. The identification information may include a PCI, which may be one of a finite set of identifiers selected by the cell to use in its communication with UEs 115. The system information may additionally or alternatively include an ECGI, which may be referred to as a network cell identifier, which may be an identifier used from an operations, administration, and management (OAM) perspective to identify or address a cell. The identification may also include NHN-ID, which may be identifier used by a neutral host or within a NHN to identify or address a cell.

In some examples, base stations 105 may detect PCI confusion by determining whether the PCI for neighboring cells is equivalent, but have different network identifiers (e.g., NHN-ID or ECGI). UEs 115 may detect PCI confusion by reading, determining, or otherwise obtaining identifying information related to neighboring cells. If a UE 115 determines that the same PCI is being used for two distinct cells, the UE 115 may then report this information to a base station 105 or other network entity (e.g., core network).

Figure 2:
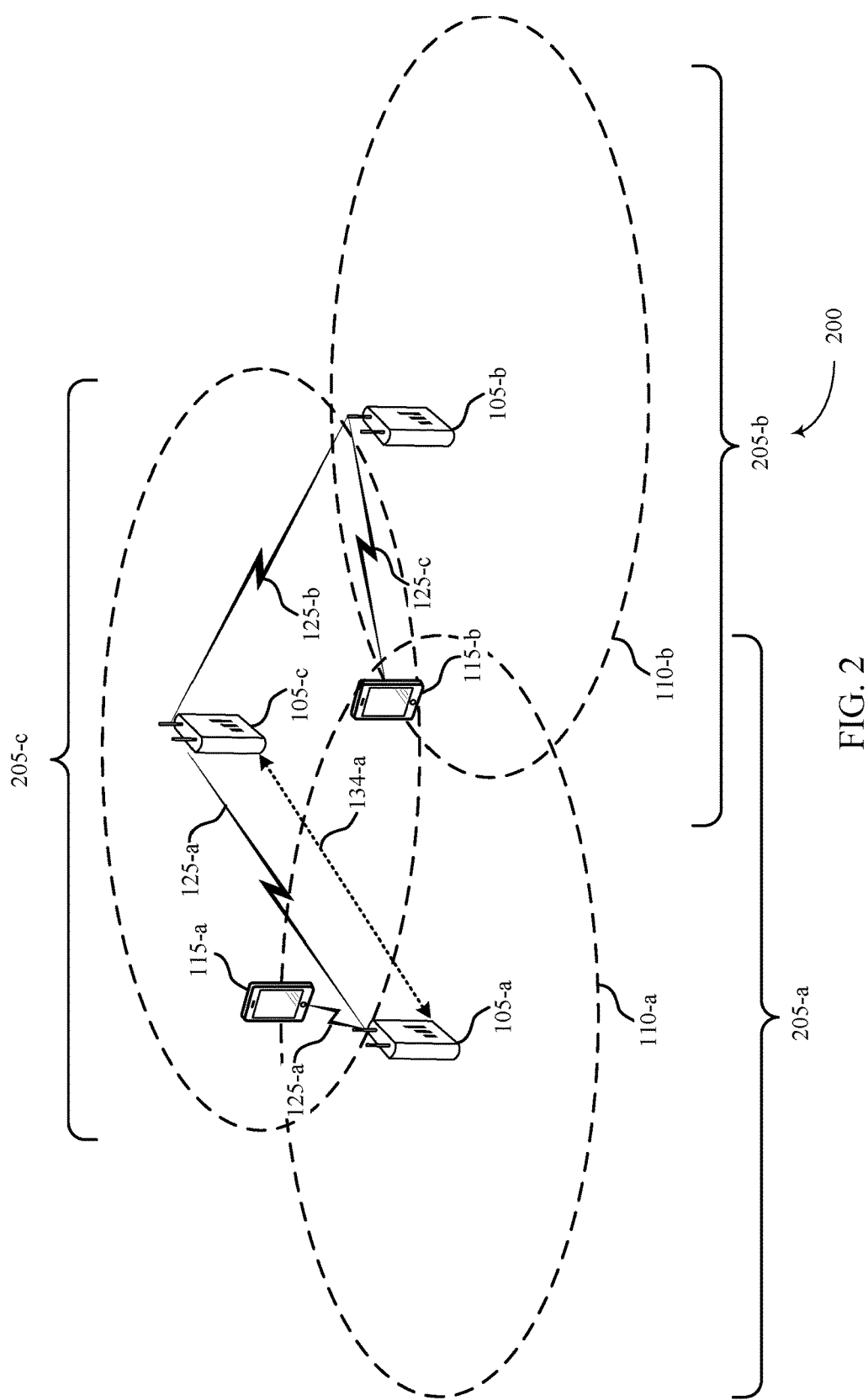
FIG. 2 illustrates an example of a system for wireless communication that supports enhanced neighbor relations and PCI confusion detection in accordance with various aspects of the present disclosure.

FIG. 2 illustrates an example of a wireless communications system 200 for enhanced neighbor relations and PCI confusion detection in accordance with various aspects of the present disclosure. Wireless communications system 200 may include base station 105-*a* (supporting serving cell 205-*a*), base station 105-*b* (supporting serving cell 205-*b*), and base station 105-*c*, which may be examples of a base station 105 described with reference to FIG. 1. The base stations 105 may employ MuLTEFire standards and communicate over unlicensed spectrum with UEs 115 and with one another via communication links 125. Base stations 105 may be in communication with one another via a wired backhaul link 134 (e.g., base stations 105-*a* and 105-*b* are depicted with wired backhaul link 134-*a*). Wireless communications system 200 may also include UE 115-*a*, UE 115-*b*, and UE 115-*c*, which may be examples of a UE 115 described with reference to FIG. 1. Base station 105-*a* may communicate with wireless devices that are within coverage area 110-*a* (e.g., base station 105-*a* may communicate with UE 115-*a* via communication link 125-*a* and communicate with UE 115-*b* via communication link 125-*b*). Base station 105-*b* may communicate with wireless devices that are within coverage area 110-*b* (e.g., base station 105-*b* may communicate with UE 115-*b* via communication link 125-*c*).

Base stations 105 may each transmit (e.g., broadcast) DRS, which may be used by UEs 115 for identification and attachment to the cells 205. DRS may include synchronization signals (e.g., PSS and SSS) that, together, convey the PCI for each cell 205. In some cases, neighboring or overlapping cells, such as cell 205-*a* and cell 205-*b*, may unintentionally select and use the same PCI or physical layer identifier. Such a scenario, which may be referred to as PCI confusion, may occur for cell 205-*c* as it has two neighboring cells that are transmitting on the same frequency and share the same PCI. A UE 115 in the coverage area 110 of one of the cells involved in PCI confusion may be affected by the PCI confusion. For instance, UE 115-*a*, which is attached to and served by cell 205-*a*, may be unaffected by the PCI confusion. However, if UE 115-*a* is served by cell 205-*c*, the PCI confusion may begin to affect the UE 115-*a*. For instance, due to PCI confusion between cell 205-*a* and cell 205-*b*, where both the cells are using the same PCI, cell 205-*c* may not know whether UE is moving towards cell 205-*a* or cell 205-*b* based on a PCI report sent by UE 115-*a* to cell 205-*c*. The confusion may impact HO from one cell to another.

As discussed above, if undetected, PCI confusion may negatively impact communications in wireless communications system 200. For example, PCI confusion may lead to HO failure for connected mode UEs 115 between two cells (e.g., due to the inability of a serving cell of UE 115 to differentiate between the target cells to which the UE 115 intends to hand-over). For instance, UE 115-*b* may initially be connected to cell 205-*c* and if PCI confusion is ongoing, UE 115-*a* may be prevented from switching connections to cell 205-*b* because the PCIs of cell 205-*a* and 205-*b* are indistinguishable at cell 205-*c* through PCIs. In another example, mobility of a UE 115 from a third cell, such as base station 105-*c*, may be impacted. For instance, UE 115-*a* may wish to connect to cell 205-*a* or cell 205-*b* but may not be able to differentiate between the two cells. PCI confusion may also result in radio link failure, or cause a UE 115-*a* to change cells unknowingly. PCI confusion may occur in various situations, including during LBT operations (e.g., when the cells 205 are aware of each other) and during hidden node operation (e.g., when the cells 205 are unaware of each other, but a UE 115 in the confusion region 210, such as UE 115-*a*, is capable of detecting the cells 205).

In some examples, the base station 105-*a* and base station 105-*b* may be in different NHNs. To distinguish between NHNs, each base station 105-*a* and 105-*b* may be associated with respective NHN-IDs unique to the NHN. Further, each base station 105-*a* and 105-*b* may be associated with a network identifier, such as an ECGI, which is used as a global identifier for networks operating in a wireless communications system.

Base stations 105 may record identifying information of neighboring cells in a NRT. The NRT may be continuously updated as new cells are activated or as previously known cells are deactivated. Base stations 105 may each store and update respective NRTs, which may contain information of corresponding neighboring cells such as the PCI, ECGI, NHN-ID, or radio access technology (RAT) associated with one or more neighboring cells. NRTs may be stored at each base station 105 and may be updated based on UE reports, for example. NRTs may also be updated using information from other base stations 105. For example, a base station may receive a NRT from another base station over a backhaul link 134 (e.g., X2) and may use information within the received NRT to update its own NRT.

In some cases, a UE report message may be used to update a NRT. The UE report may be requested by the network or a base station 105. For example, a base station may be performing a configuration update, a reconfiguration update, and may request that the UE provide a report of neighboring cells. In another example, a base station 105 may participate in X2 interface setup by sending an X2 setup request message to another network entity. The base station 105 may then use information within a response to the X2 setup request message to update a NRT.

In a multiple RAT deployment, a neighboring cell may support communication using a first RAT (e.g., LTE FDD), while a serving cell may support a different RAT (e.g., LTE TDD). This information (e.g., RAT type) may be used to update a NRT and may also be used to influence HO decisions (e.g., certain UE services may work better with certain RATs). In some cases, a UE may also report RAT type of a neighboring cell to a serving cell when requested by the network or periodically (e.g., in a RRC reconfiguration procedure).

In some cases, a UE 115 may be prevented from handing over to a neighbor cell if the UE 115 is unable to differentiate between the respective PCIs of the serving cell and the target neighbor cell. As successful HO procedures may rely on accurate knowledge of PCI of a target cell, if HO fails, the UE may read the failed target cell identifiers (e.g., PCI, ECGI, NHN-ID, or RAT type) to determine if the ECGI or the NHN-ID is different. In doing so, the UE may determine that PCI confusion exists and may notify the serving station or another network entity. In some cases, the UE 115 may notify the operations, OAM, such as a network operator or host, of PCI confusion.

According to the techniques described herein, a base station 105 may detect and resolve PCI confusion. In some cases, the base station 105 may detect PCI confusion by comparing identifying information of neighboring cells in its own NRT with information contained within another NRT (e.g., received over an X2 interface). Additionally or alternatively, a UE 115 may detect PCI confusion by decoding SIBs or eSIBs. For instance, a UE 115 may use an eSIB sent by a cell to determine SI corresponding to that cell. The UE 115 may compare the SI conveyed by the eSIB to SI of the cell for which it received a HO command. If the system information does not match, the UE 115 may determine that PCI confusion has occurred. The UE 115 may then report the PCI confusion to a base station 105 or other network entity.

Figure 3:
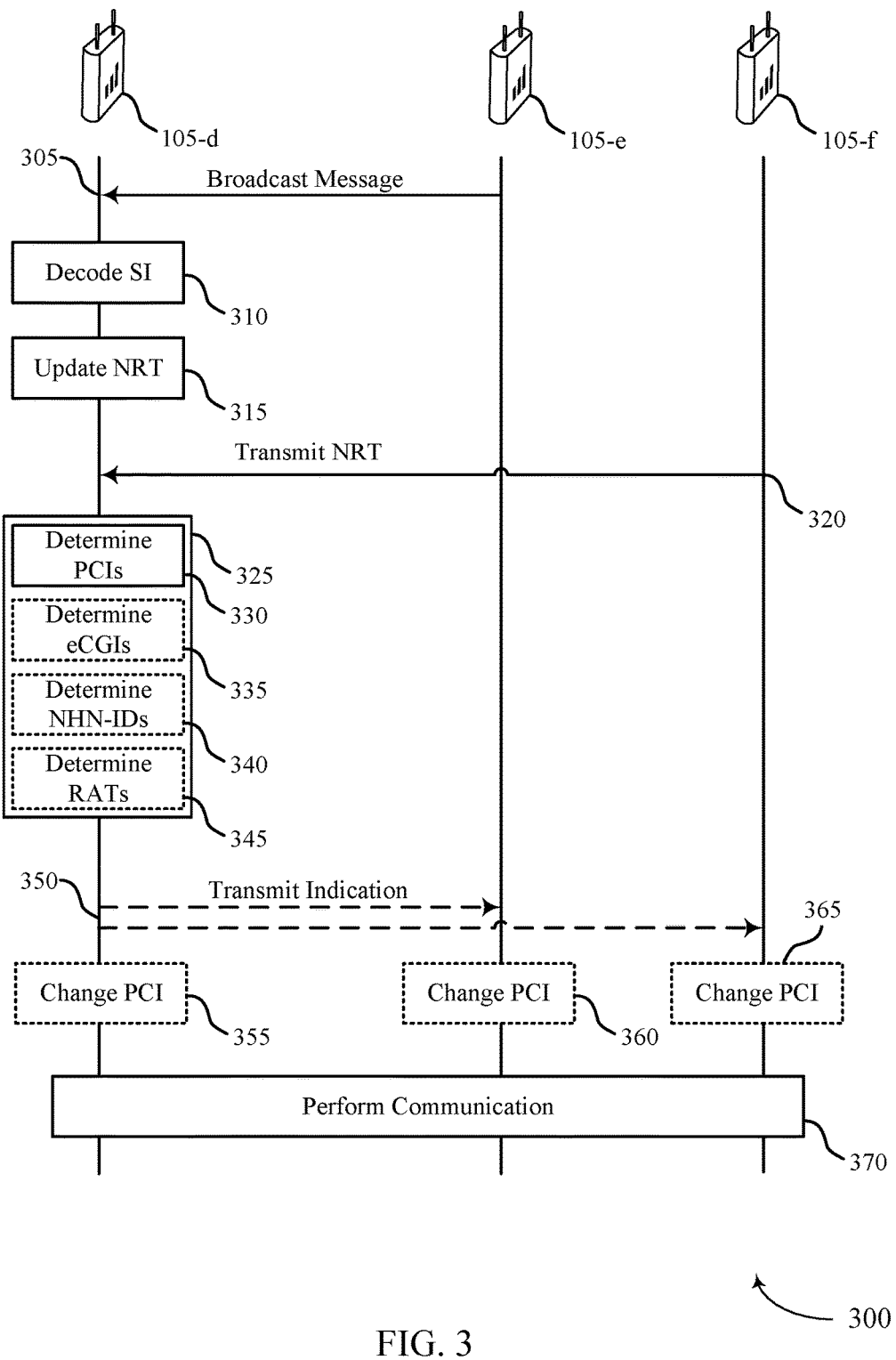
FIGS. 3-5 illustrate examples of process flows that support enhanced neighbor relations and PCI confusion detection in accordance with various aspects of the present disclosure.

FIG. 3 illustrates an example of a process flow 300 for enhanced neighbor relations and PCI confusion detection in accordance with various aspects of the present disclosure. Process flow 300 may represent aspects of techniques performed by a base station 105 as described with reference to FIGS. 1 and 2. In the example depicted in process flow 300, base station 105-*d*, base station 105-*e*, and base station 105-*f* may communicate in a shared or unlicensed radio frequency spectrum band using MuLTEFire.

At 305, base station 105-*e* may transmit a broadcast message (e.g., using a PBCH), which is received by base station 105-*d*. In some examples, base stations 105 may communicate using wired backhaul links, so at 305 information similar to a broadcast message may be sent via a backhaul link. Using the broadcast message, base station 105-*d* may decode the SI associated with base station 105-*e* at 310 (e.g., by decoding SIB1 or an eSIB). In some cases, the broadcast message may include other identifying information of base station 105-*e*. For example, broadcast message may include a PCI, an ECGI, a NHN-ID, or a RAT associated with base station 105-*e*. Using the information obtained from the broadcast message, base station 105-*d* may update a NRT with at least one of the PCI, the ECGI, the NHN-ID, or the RAT associated with base station 105-*e* at 315.

At 320, base station 105-*f* may transmit its respective NRT (or information relating to its NRT) to base station 105-*d*. Using information within the received NRT, base station 105-*d* may detect PCI confusion at 325. PCI confusion may be detected by determining the PCIs associated with neighboring cells at 330. In some cases, if at least two PCIs are equivalent, the base station 105-*d* may then compare the ECGIs of the neighboring cells to determine if the ECGIs are different at 335. If so, the base station 105-*d* may detect that PCI confusion has occurred or may be likely to occur.

At 340, if the PCIs and the ECGIs of two neighboring cells are the same, the base station 105-*d* may identify NHN-IDs associated with the two neighboring cells. If the NHN-IDs are different, the base station 105-*d* determines that PCI confusion has occurred. In some cases, at 345, the base station 345 may also determine the RAT associated with each of the two neighboring cells. For example, if the two neighboring cells have the same identifying information, but operate on different RATs, PCI confusion may not be an issue as communicate may occur in two different RATs without being affected by neighboring cells having the same PCI. For example, a UE may be incapable of communicating using a particular RAT and therefore would not consider handing over to a target cell associated with that RAT.

At 350, if PCI confusion is detected, base station 105-*d* may transmit an indication to either or both of base station 105-*e* and 105-*f*. The indication may be accompanied with a request to change PCI, if one of base stations 105-*e* and 105-*f* are subject to PCI confusion. In some examples, base station 105-*d* may detect that a neighboring cell has the same PCI as its own PCI and may change PCI at 355. Additionally, or alternatively, base station 105-*e* may change PCI at 360 or base station 105-*f* may change PCI at 365 if PCI confusion is detected. Once PCI confusion is resolved, base station 105-*d*, 105-*e*, and 105-*f* may perform communication (e.g., with one another or with other devices) at 370.

Figure 4:
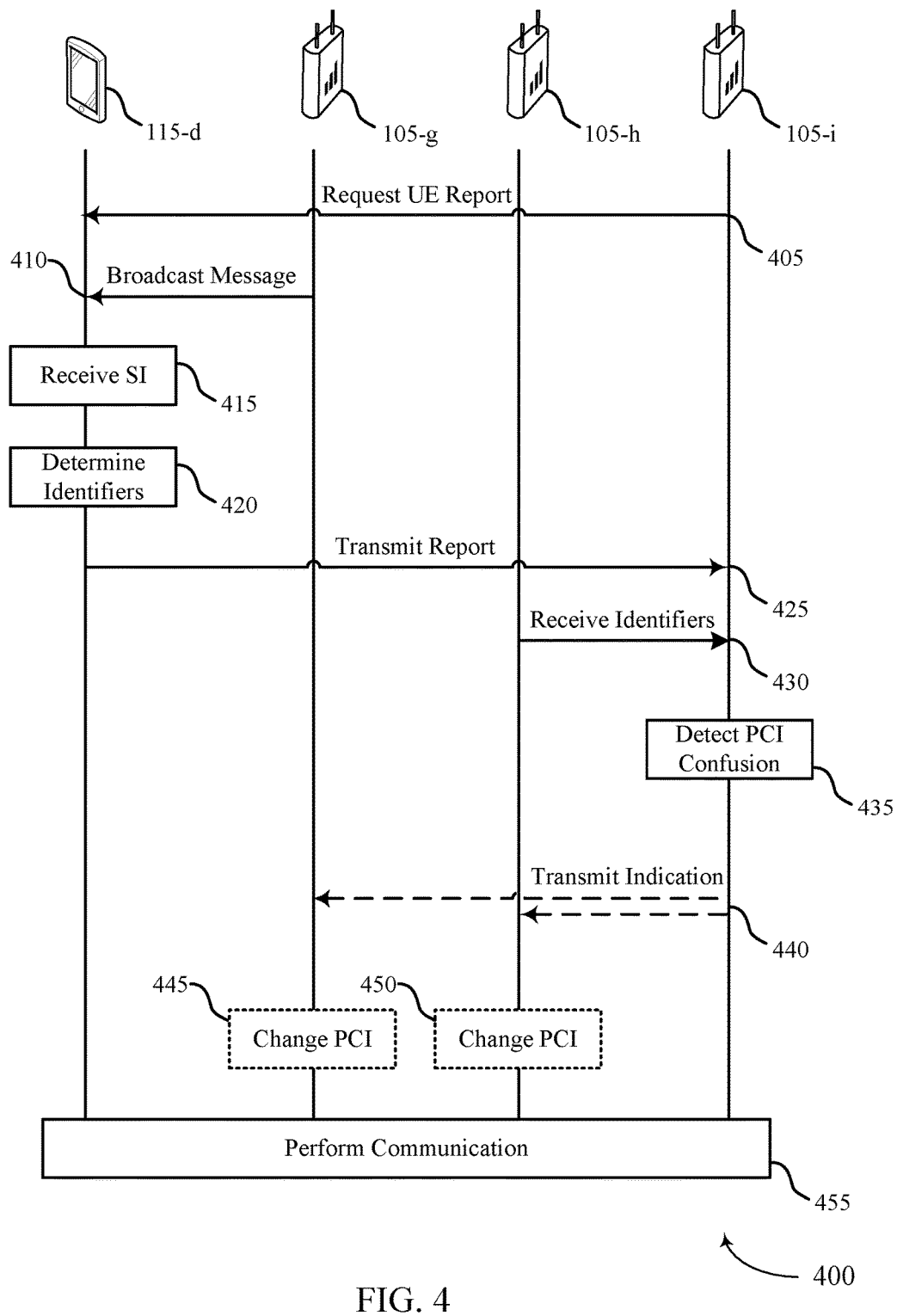

FIG. 4 illustrates an example of a process flow 400 for enhanced neighbor relations and PCI confusion detection in accordance with various aspects of the present disclosure. Process flow 400 may represent aspects of techniques performed by a base station 105 or a UE 115 as described with reference to FIGS. 1 and 2. In the example depicted in process flow 400, base station 105-*g*, base station 105-*h*, base station 105-*i*, and UE 115-*d* may communicate in a shared or unlicensed radio frequency spectrum band using MuLTEFire.

At 405, base station 105-*i* may transmit a request to UE 115-*d* requesting the UE to transmit a report regarding neighboring base station 105-*g*. In some examples, the request may include a PCI associated with the neighboring base station 105-*g* or may include other identifying information such as ECGI, NHN-ID, or RAT type. At 410, neighboring base station 105-*g* may broadcast a message (e.g., using a PBCH), which may be received by UE 115-*d*. Using the broadcast message, UE 115-*d* may determine SI from the broadcast message at 415 and may then determine one or more identifiers (e.g., such as ECGI, NHN-ID, or RAT type) associated with base station 105-*g* at 420. Once the identifying information of base station 105-*g* is determined by UE 115-*d*, the UE 115-*d* may transmit a report including the identifiers of base station 105-*g* to base station 105-*i* at 425.

At 430, base station 105-*i* may receive identifiers associated with neighboring base station 105-*h* (e.g., over a backhaul link). By comparing the identifiers received from base station 105-*h* and the identifiers in the report transmitted by UE 115-*d* at 425, the base station 105-*i* may detect that PCI confusion has occurred between base stations 105-*g* and 105-*h* at 435. Detecting PCI confusion at 415 may include determining the PCI of neighboring base stations 105-*g* and 105-*h* are the same and the ECGIs of base stations 105-*g* and 105-*h* are different.

In some examples, at 435, the base station 105-*i* may determine and compare the NHN-ID associated with neighboring base station 105-*g* (or cell) from the report transmitted at 425 with the NHN-ID received at 430. If the NHN-IDs differ, the base station 105-*i* may determine that PCI confusion has occurred. In some cases, at 435, the base station 105-*i* may also determine the RAT associated with base station 105-*h* and compare the RAT in the transmitted report with the RAT received at 430. For example, if the two base stations 105-*g* and 105-*h* have the same identifying information, but operate on different RATs, PCI confusion may not be an issue as communication may sometimes occur in two different RATs without being affected by neighboring cells having the same PCI.

At 440, if PCI confusion is detected, base station 105-*i* may transmit an indication to base station 105-*g*, base station 105-*h*, or both. The indication may include a request to change PCI or provide information on identifiers (e.g., PCI, ECGI) to allow base station 105-*g*, base station 105-*h*, or both to detect PCI confusion. Based on the indication, base station 105-*g* may change PCI at 445 or base station 105-*h* may change PCI at 450 to avoid PCI confusion. Thereafter, base station 105-*g*, base station 105-*h*, and UE 115-*d* may communicate at 455.

Figure 5:
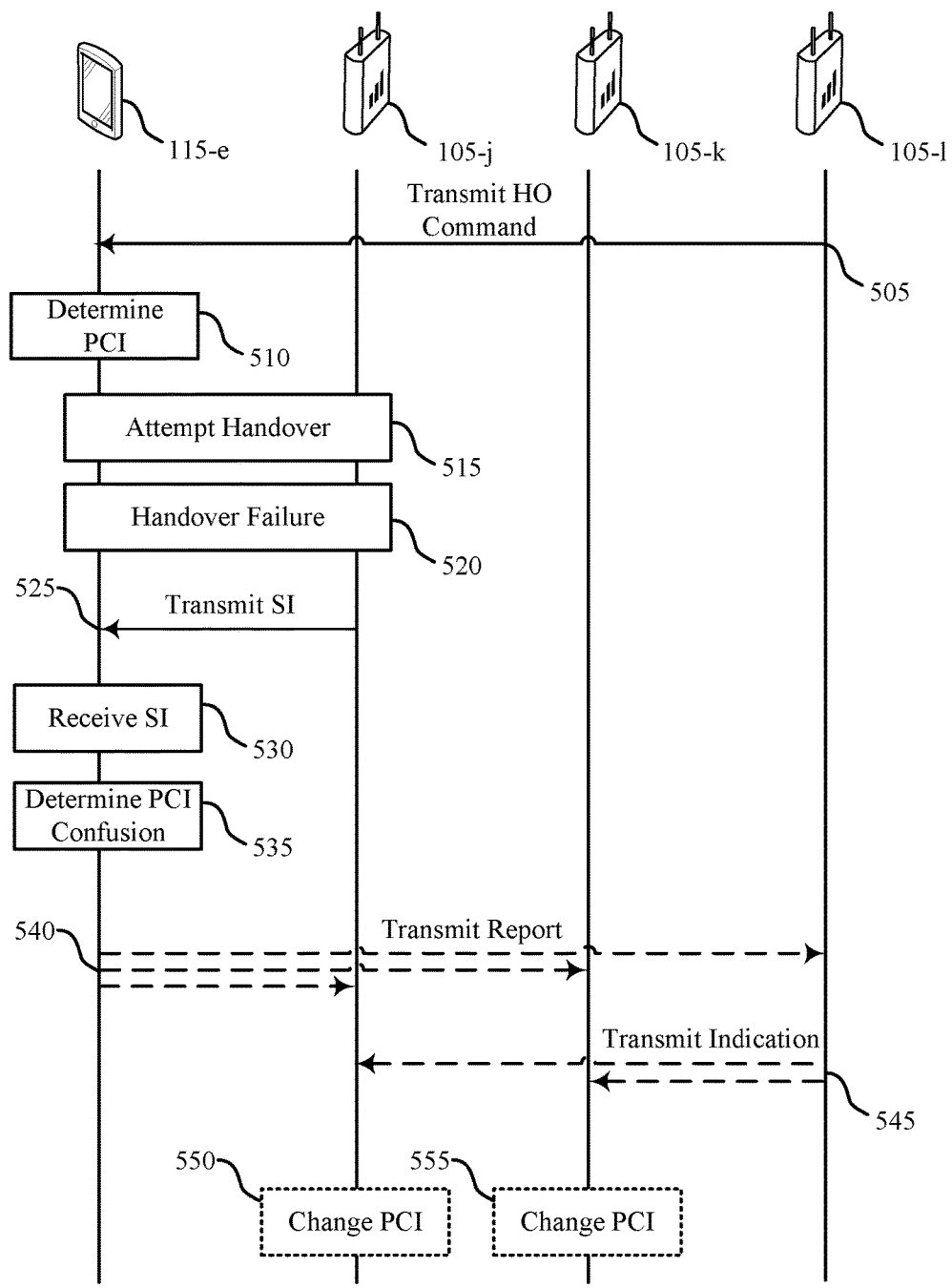

FIG. 5 illustrates an example of a process flow 500 for enhanced neighbor relations and PCI confusion detection in accordance with various aspects of the present disclosure. Process flow 500 may represent aspects of techniques performed by a base station 105 or a UE 115 as described with reference to FIGS. 1 and 2. In the example depicted in process flow 500, base station 105-*j*, base station 105-*k*, base station 105-1, and UE 115-*e* may communicate in a shared or unlicensed radio frequency spectrum band using MuL-TEFire.

At 505, base station 105-1 may transmit an HO command to UE 115-*e* requesting that UE perform HO. The HO command may include a PCI of the target cell to which the UE is HO. At 510, the UE 115-*e* determines the PCI of the target cell and attempts to HO at 515 to the target base station 105-*j* (or target cell) associated with the PCI determined at 510. At 520, the UE 115-*e* may experience a HO failure and base station 105-*j* transmits SI to UE 115-*e* at 525.

After receiving the SI at 530, the UE may determine that PCI confusion has occurred at 535. The UE 115-*e* may determine PCI confusion by identifying information in the SI with the information transmitted in the HO command. For example, if the PCI is the same, but the ECGI of base station 105-*j* differs from the ECGI in the HO command, the UE 115-*e* may determine that PCI confusion has occurred. Based on the determination, the UE 115-may transmit a report to any of base station 105-*j*, 105-*k*, and 105-1 at 540. The report may indicate that PCI confusion has occurred.

Based on the report transmitted by UE 115-*e*, base station 105-1 may transmit an indication to base station 105-*j* and 105-*k* at 545. The indication may include a request to change PCI at base station 105-*j* at 550 or a request to change PCI at base station 105-*k* at 555 or information on identifiers (e.g., PCI, ECGI) to allow base station 105-*j*, base station 105-*k*, or both, to detect PCI confusion, as each of base station 105-*j* and 105-*k* have the same PCI and are subject to PCI confusion.

Figure 6:
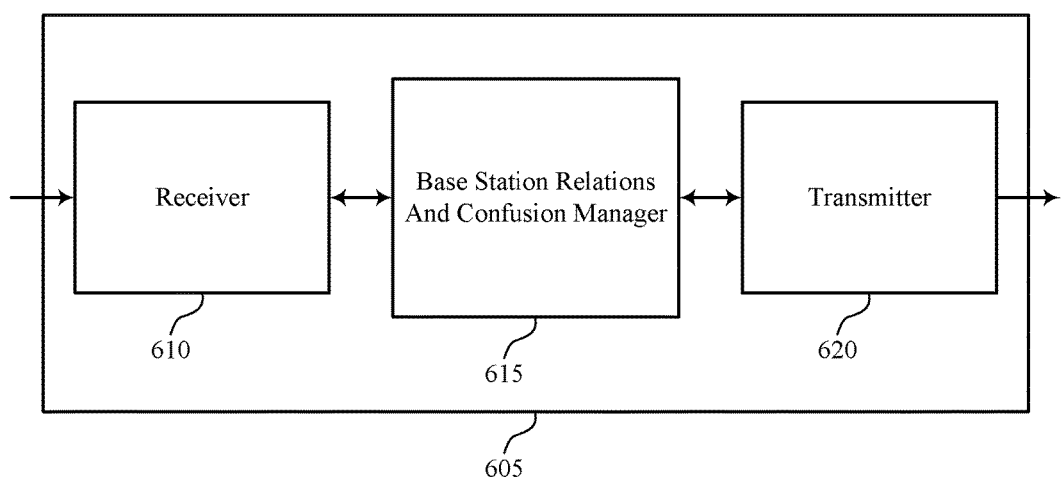
FIGS. 6 through 8 show block diagrams of a device that supports enhanced neighbor relations and PCI confusion detection in accordance with various aspects of the present disclosure.

FIG. 6 shows a block diagram 600 of a wireless device 605 that supports enhanced neighbor relations and PCI confusion detection in accordance with various aspects of the present disclosure. Wireless device 605 may be an example of aspects of a base station 105 as described with reference to FIG. 1. Wireless device 605 may include receiver 610, base station relations and confusion manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to enhanced neighbor relations and PCI confusion detection, etc.). Information may be passed on to other components of the device. The receiver 610 may be an example of aspects of the transceiver 935 described with reference to FIG. 9.

Receiver 610 may receive, at the first base station, a report from the UE that includes an indication that a second base station and at least one additional base station are using a same PCI, where the second base station and the at least one additional base station are each operating in the shared radio frequency spectrum band.

Base station relations and confusion manager 615 may be an example of aspects of the base station relations and confusion manager 915 described with reference to FIG. 9. The operations of base station relations and confusion manager 615 may be performed in combination with receiver 610 or transmitter 620. Base station relations and confusion manager 615 may receive first identification information that includes a first PCI, a first network cell identifier, and a first NHN-ID for a first base station, receive second identification information that includes a second PCI, a second network cell identifier, and a second NHN-ID for a second base station, determine that the first NHN-ID is different from the second NHN-ID, and store the first identification information and the second identification information based on the determination that the first NHN is different from the second NHN. The base station relations and confusion manager 615 may also communicating with a UE with a first base station in a shared radio frequency spectrum band.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
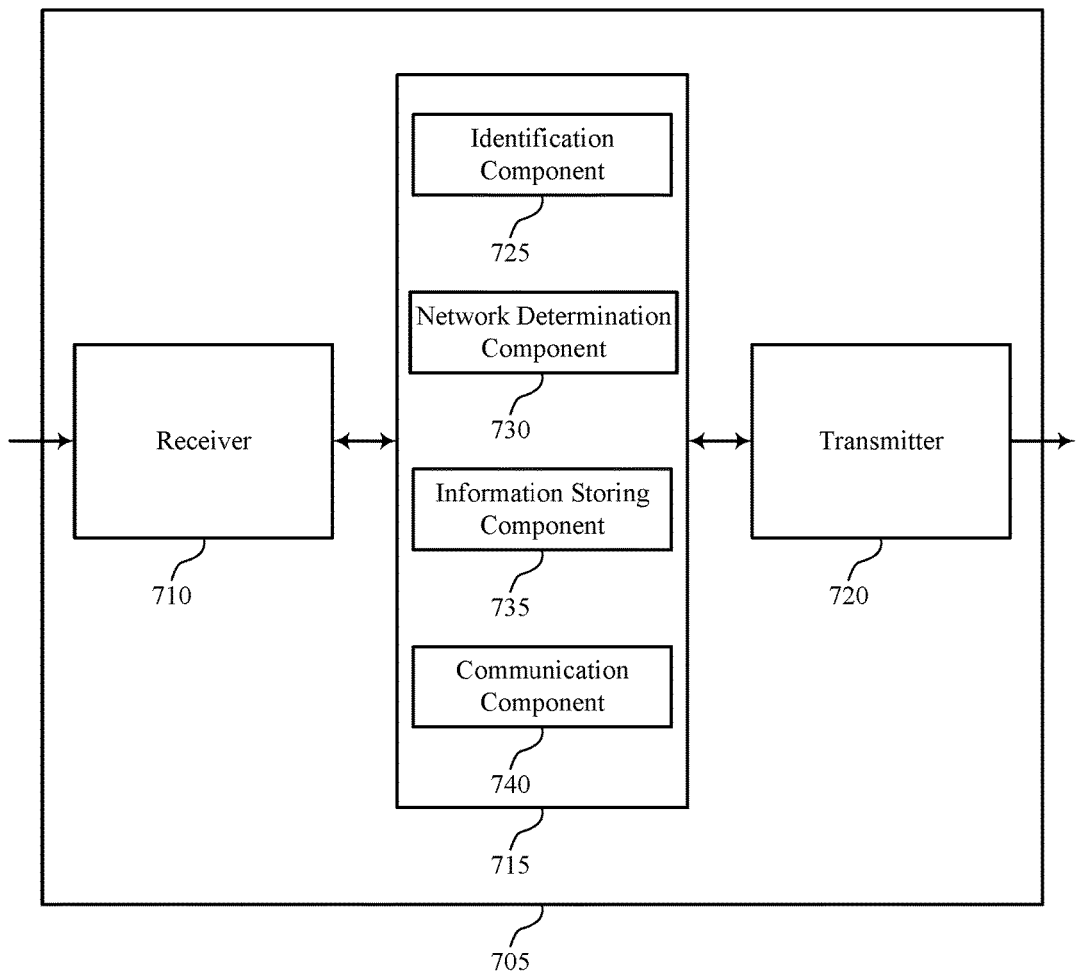

FIG. 7 shows a block diagram 700 of a wireless device 705 that supports enhanced neighbor relations and PCI confusion detection in accordance with various aspects of the present disclosure. Wireless device 705 may be an example of aspects of a wireless device 605 or a base station 105 as described with reference to FIGS. 1 through 6. Wireless device 705 may include receiver 710, base station relations and confusion manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to enhanced neighbor relations and PCI confusion detection, etc.). Information may be passed on to other components of the device. The receiver 710 may be an example of aspects of the transceiver 935 described with reference to FIG. 9.

Base station relations and confusion manager 715 may be an example of aspects of the base station relations and confusion manager 915 described with reference to FIG. 9. Base station relations and confusion manager 715 may also include identification component 725, network determination component 730, information storing component 735, and communication component 740.

Identification component 725 may receive first identification information that includes a first PCI, a first network cell identifier, and a first NHN-ID for a first base station and receive second identification information that includes a second PCI, a second network cell identifier, and a second NHN-ID for a second base station. In some cases, the first identification information and the second identification information are received at a third base station, where the third base station is a neighbor to the first base station and the third base station is a neighbor to the second base station. In some cases, the first network cell identifier and the second network cell identifier each includes an ECGI. In some cases, the first identification information or the second identification information, or both, is received from a UE. In some cases, the first identification information or the second identification information, or both, includes an indication of a RAT used by the second base station.

Network determination component 730 may determine that the first NHN-ID is different from the second NHN-ID and transmit a message to at least one of first base station, the second base station, or a third base station, or any combination thereof, based on the determination that the first NHN is different from the second NHN. In some cases, the message includes an indication to change a PCI. In some cases, determining that the first NHN-ID is different from the second NHN includes: determining that the first PCI is equivalent to the second PCI. In some cases, determining that the first NHN-ID is different from the second NHN includes: determining that the first network cell identifier is equivalent to the second network cell identifier.

Information storing component 735 may store the first identification information and the second identification information based on the determination that the first NHN is different from the second NHN.

Communication component 740 may communicate with a UE with a first base station in a shared radio frequency spectrum band and transmit, to the second base station or a third base station, an indication that the second base station is using the same cell identifier as the at least one additional base station. In some cases, the at least one additional base station includes a third base station, and the second base station and the third base station are using the same PCI. In some cases, the first base station and the second base station are in a same NHN.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
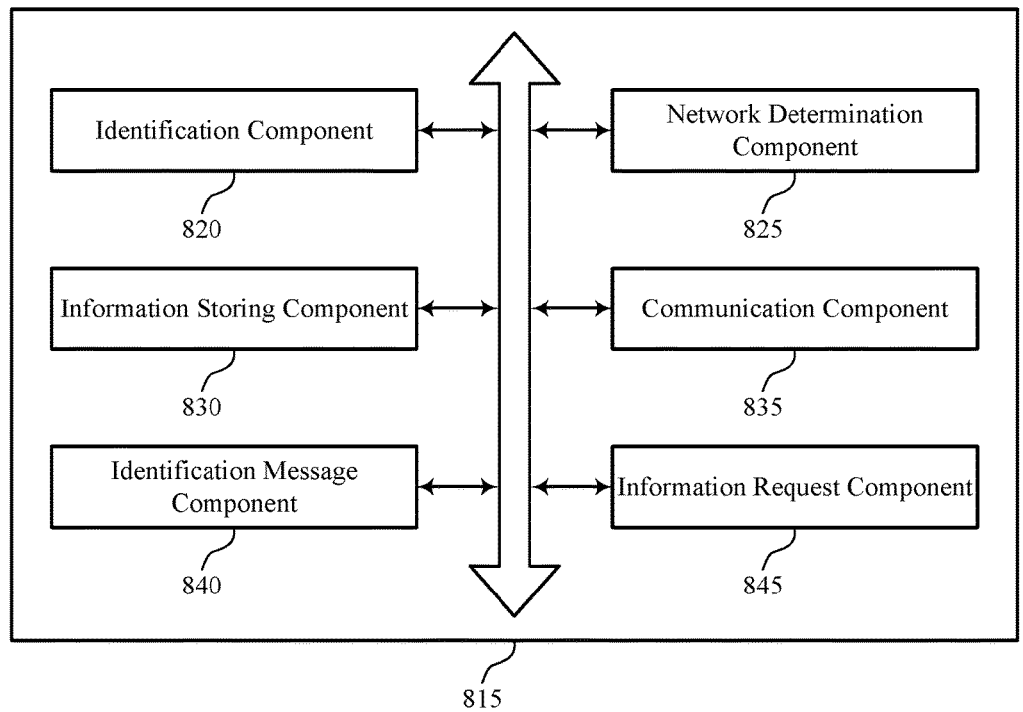

FIG. 8 shows a block diagram 800 of a base station relations and confusion manager 815 that supports enhanced neighbor relations and PCI confusion detection in accordance with various aspects of the present disclosure. The base station relations and confusion manager 815 may be an example of aspects of a base station relations and confusion manager 615, a base station relations and confusion manager 715, or a base station relations and confusion manager 915 described with reference to FIGS. 6, 7, and 9. The base station relations and confusion manager 815 may include identification component 820, network determination component 825, information storing component 830, communication component 835, identification message component 840, and information request component 845. Each of these modules may communicate, directly or indirectly, with one another (e.g., via one or more buses).

Identification component 820 may receive first identification information that includes a first PCI, a first network cell identifier, and a first NHN-ID for a first base station and receive second identification information that includes a second PCI, a second network cell identifier, and a second NHN-ID for a second base station. In some cases, the first identification information and the second identification information are received at a third base station, where the third base station is a neighbor to the first base station and the third base station is a neighbor to the second base station. In some cases, the first network cell identifier and the second network cell identifier each includes an ECGI. In some cases, the first identification information or the second identification information, or both, is received from a UE. In some cases, the first identification information or the second identification information, or both, includes an indication of a RAT used by the second base station.

Network determination component 825 may determine that the first NHN-ID is different from the second NHN-ID and transmit a message to at least one of first base station, the second base station, or a third base station, or any combination thereof, based on the determination that the first NHN is different from the second NHN. In some cases, the message includes an indication to change a PCI. In some cases, determining that the first NHN-ID is different from the second NHN includes: determining that the first PCI is equivalent to the second PCI. In some cases, determining that the first NHN-ID is different from the second NHN includes: determining that the first network cell identifier is equivalent to the second network cell identifier.

Information storing component 830 may store the first identification information and the second identification information based on the determination that the first NHN is different from the second NHN. Communication component 835 may communicate with a UE with a first base station in a shared radio frequency spectrum band and transmit, to the second base station or a third base station, an indication that the second base station is using the same cell identifier as the at least one additional base station. In some cases, the at least one additional base station includes a third base station, and the second base station and the third base station are using the same PCI. In some cases, the first base station and the second base station are in a same NHN.

Identification message component 840 may receive the first identification information or the second identification information, or both. In some cases, the first identification information or the second identification information, or both, is received in a broadcast message. In some cases, the broadcast message includes a SIB or an eSIB. In some cases, the first identification information is received in a message from first base station over a backhaul link with the first base station or the second base station. In some cases, the second identification information is received in a message from the second base station over a backhaul link with the first base station or the second base station.

Information request component 845 may transmit a request to at least one UE to read and report system information for newly detected cell identifiers. In some cases, the request includes a list of known cell identifiers for one or more base stations.

Figure 9:
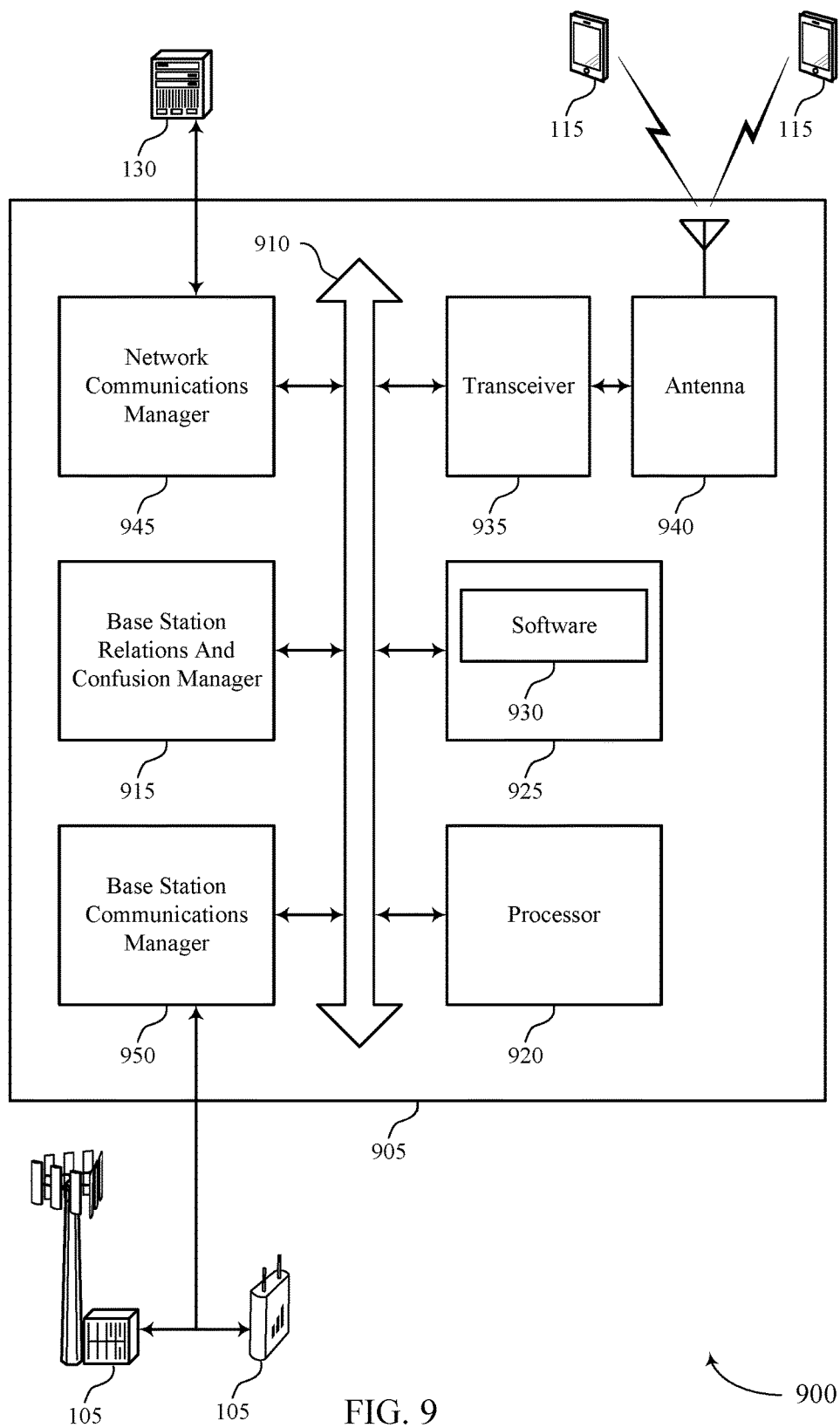
FIG. 9 illustrates a block diagram of a system including a base station that supports enhanced neighbor relations and PCI confusion detection in accordance with various aspects of the present disclosure.

FIG. 9 shows a diagram of a system 900 including a device 905 that supports enhanced neighbor relations and PCI confusion detection in accordance with various aspects of the present disclosure. Device 905 may be an example of or include the components of wireless device 605, wireless device 705, or a base station 105 as described above, e.g., with reference to FIGS. 1 through 7.

Device 905 may include components for bi-directional voice and data communications including components for transmitting and receiving communications, including base station relations and confusion manager 915, processor 920, memory 925, software 930, transceiver 935, antenna 940, network communications manager 945, and base station communications manager 950.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting enhanced neighbor relations and PCI confusion detection).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support enhanced neighbor relations and PCI confusion detection. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions. Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
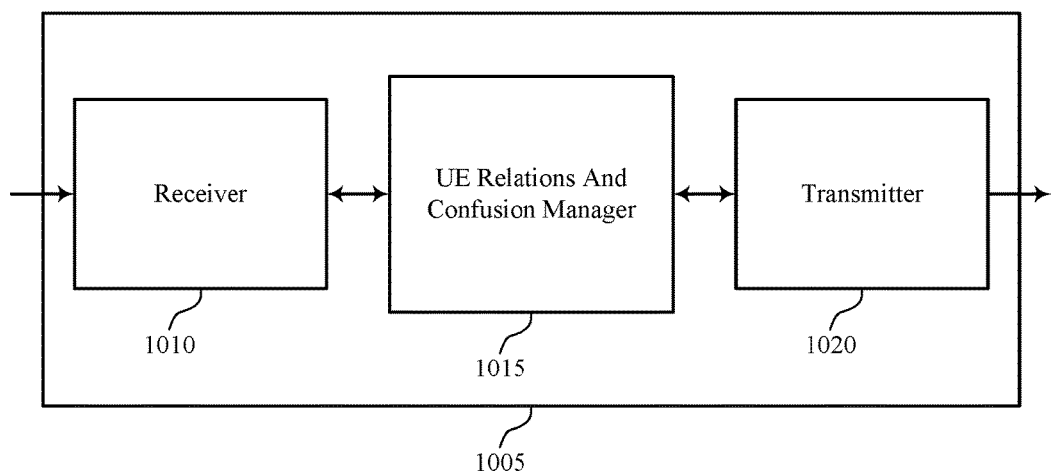
FIGS. 10 through 12 show block diagrams of a device that supports enhanced neighbor relations and PCI confusion detection in accordance with various aspects of the present disclosure.

FIG. 10 shows a block diagram 1000 of a wireless device 1005 that supports enhanced neighbor relations and PCI confusion detection in accordance with various aspects of the present disclosure. Wireless device 1005 may be an example of aspects of a UE 115 as described with reference to FIGS. 1 through 5. Wireless device 1005 may include receiver 1010, UE relations and confusion manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to enhanced neighbor relations and PCI confusion detection, etc.). Information may be passed on to other components of the device. The receiver 1010 may be an example of aspects of the transceiver 1335 described with reference to FIG. 13.

Receiver 1010 may receive, from the second base station, a request to read and report system information for cell identifiers, where the cell identifier and the NHN ID is transmitted in response to the request. In some cases, the request includes a list of known cell identifiers for one or more base stations. In some cases, the request includes an indication to report newly detected cell identifiers.

UE relations and confusion manager 1015 may be an example of aspects of the UE relations and confusion manager 1315 described with reference to FIG. 13. UE relations and confusion manager 1015 may perform operations and functions in combination with receiver 1010 or transmitter 1020, or both. UE relations and confusion manager 1015 may determine a cell identifier and a NHN-ID for a first base station that is operating in a first NHN in a shared radio frequency spectrum band and transmit the cell identifier and the NHN ID to a second base station that is operating in the first NHN or a second NHN in the shared radio frequency spectrum band. The UE relations and confusion manager 1015 may also receive a HO command from a first base station operating in a shared radio frequency spectrum band, where the HO command includes a PCI for a second base station operating in the shared radio frequency spectrum band, identify a third base station operating in the shared radio frequency spectrum band as a target for a HO operation, where the third base station is identified as the target based on the PCI, and determine that the HO operation failed based on the second base station and the third base station each using the PCI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
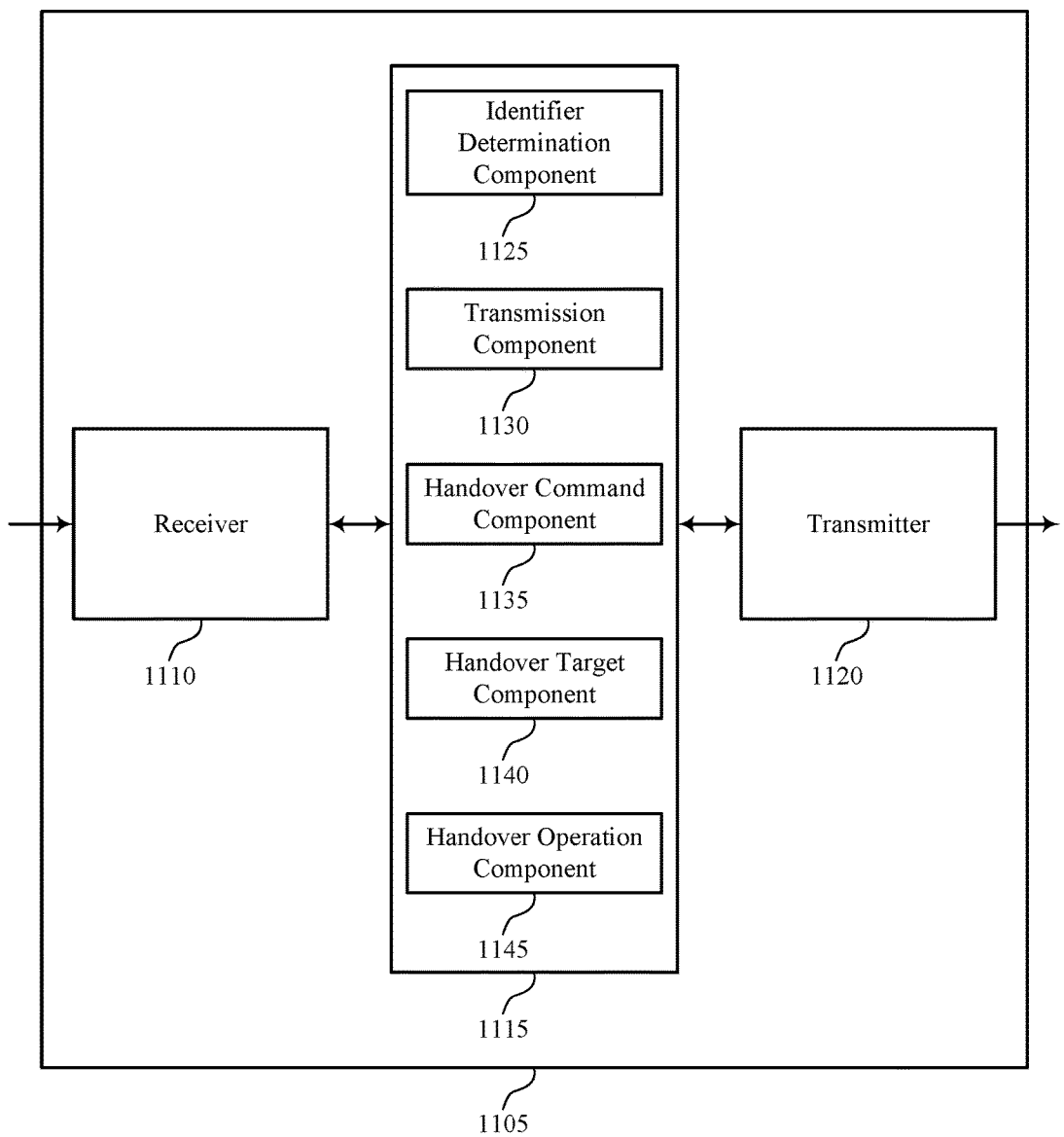

FIG. 11 shows a block diagram 1100 of a Wireless device 1105 that supports enhanced neighbor relations and PCI confusion detection in accordance with various aspects of the present disclosure. Wireless device 1105 may be an example of aspects of a wireless device 1005 or a UE 115 as described with reference to FIGS. 1 through 5 and 10. Wireless device 1105 may include receiver 1110, UE relations and confusion manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to enhanced neighbor relations and PCI confusion detection, etc.). Information may be passed on to other components of the device. The receiver 1110 may be an example of aspects of the transceiver 1335 described with reference to FIG. 13.

UE relations and confusion manager 1115 may be an example of aspects of the UE relations and confusion manager 1315 described with reference to FIG. 13. UE relations and confusion manager 1115 may also include identifier determination component 1125, transmission component 1130, HO command component 1135, HO target component 1140, and HO operation component 1145.

Identifier determination component 1125 may determine a cell identifier and a NHN-ID for a first base station that is operating in a first NHN in a shared radio frequency spectrum band. Transmission component 1130 may transmit the cell identifier and the NHN ID to a second base station that is operating in the first NHN or a second NHN in the shared radio frequency spectrum band and transmit an indication of the RAT used by the first base station to the second base station.

HO command component 1135 may receive a HO command from a first base station operating in a shared radio frequency spectrum band, where the HO command includes a PCI for a second base station operating in the shared radio frequency spectrum band.

HO target component 1140 may identify a third base station operating in the shared radio frequency spectrum band as a target for a HO operation, where the third base station is identified as the target based on the PCI and receive system information from the third base station.

HO operation component 1145 may determine that the HO operation failed based on the second base station and the third base station each using the PCI and receive system information from the third base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
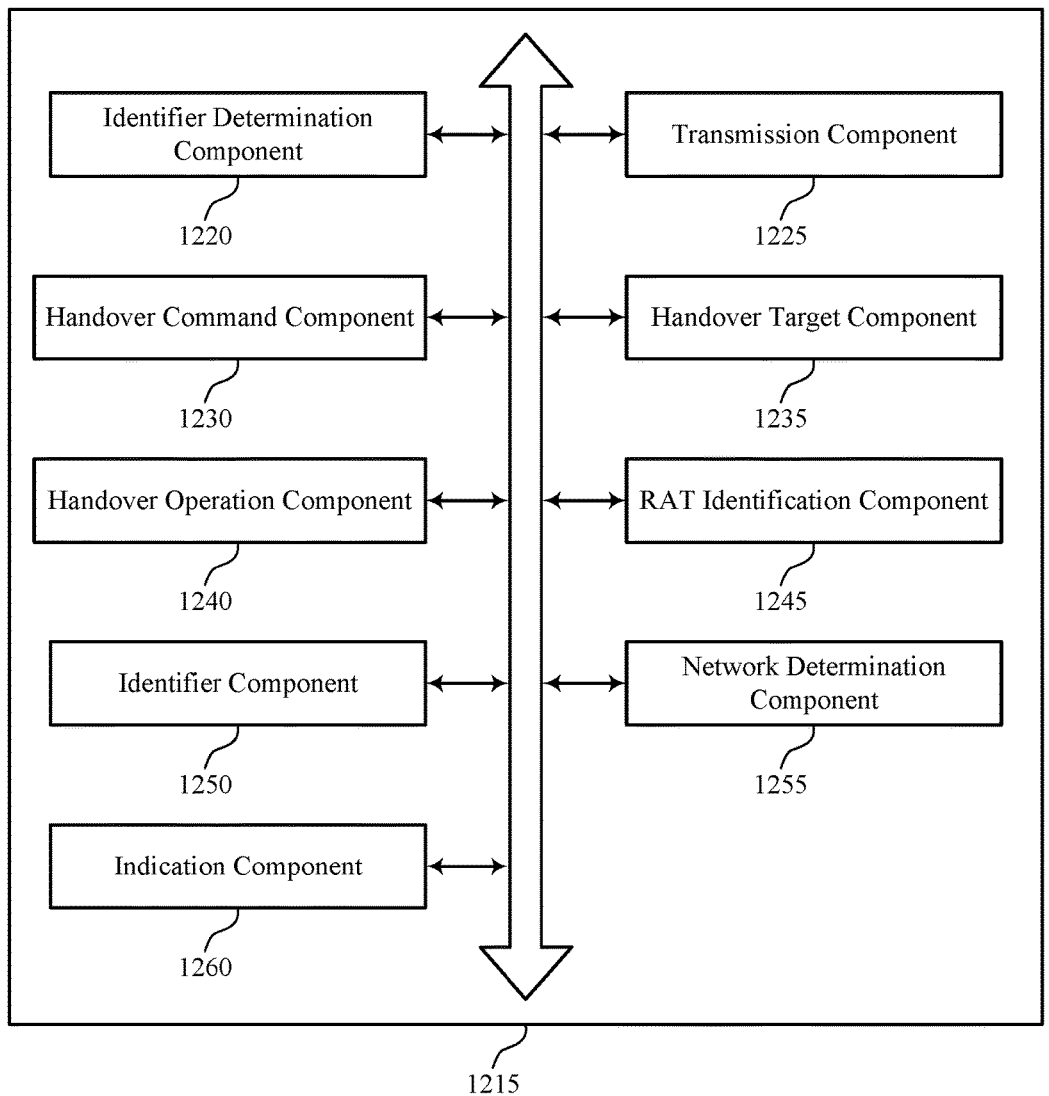

FIG. 12 shows a block diagram 1200 of a UE relations and confusion manager 1215 that supports enhanced neighbor relations and PCI confusion detection in accordance with various aspects of the present disclosure. The UE relations and confusion manager 1215 may be an example of aspects of a UE relations and confusion manager 1315 described with reference to FIGS. 10, 11, and 13. The UE relations and confusion manager 1215 may include identifier determination component 1220, transmission component 1225, HO command component 1230, HO target component 1235, HO operation component 1240, RAT identification component 1245, identifier component 1250, network determination component 1255, and indication component 1260. Each of these modules may communicate, directly or indirectly, with one another (e.g., via one or more buses).

Identifier determination component 1220 may determine a cell identifier and a NHN-ID for a first base station that is operating in a first NHN in a shared radio frequency spectrum band.

Transmission component 1225 may transmit the cell identifier and the NHN ID to a second base station that is operating in the first NHN or a second NHN in the shared radio frequency spectrum band and transmit an indication of the RAT used by the first base station to the second base station.

HO command component 1230 may receive a HO command from a first base station operating in a shared radio frequency spectrum band, where the HO command includes a PCI for a second base station operating in the shared radio frequency spectrum band.

HO target component 1235 may identify a third base station operating in the shared radio frequency spectrum band as a target for a HO operation, where the third base station is identified as the target based on the PCI and receive system information from the third base station.

HO operation component 1240 may determine that the HO operation failed based on the second base station and the third base station each using the PCI and receive system information from the third base station. RAT identification component 1245 may identify a RAT used by the first base station.

Identifier component 1250 may identify a cell network identifier in the system information from the third base station, where the determination that the second base station and the third base station are each using the PCI is based on identifying the cell network identifier in the system information and identify a NHN-ID of the third base station in the system information. Network determination component 1255 may determine that the NHN-ID of the third base station is different from a NHN-ID of the first base station.

Indication component 1260 may transmit, to the third base station, an indication that the second base station and the third base station each using the PCI, store an indication that the second base station and the third base station are each using the PCI and different NHN-IDs, and transmit a report that includes the indication that the second base station and the third base station are each using the PCI, where the report is transmitted to the first base station or another base station in a same NHN as the first base station.

Figure 13:
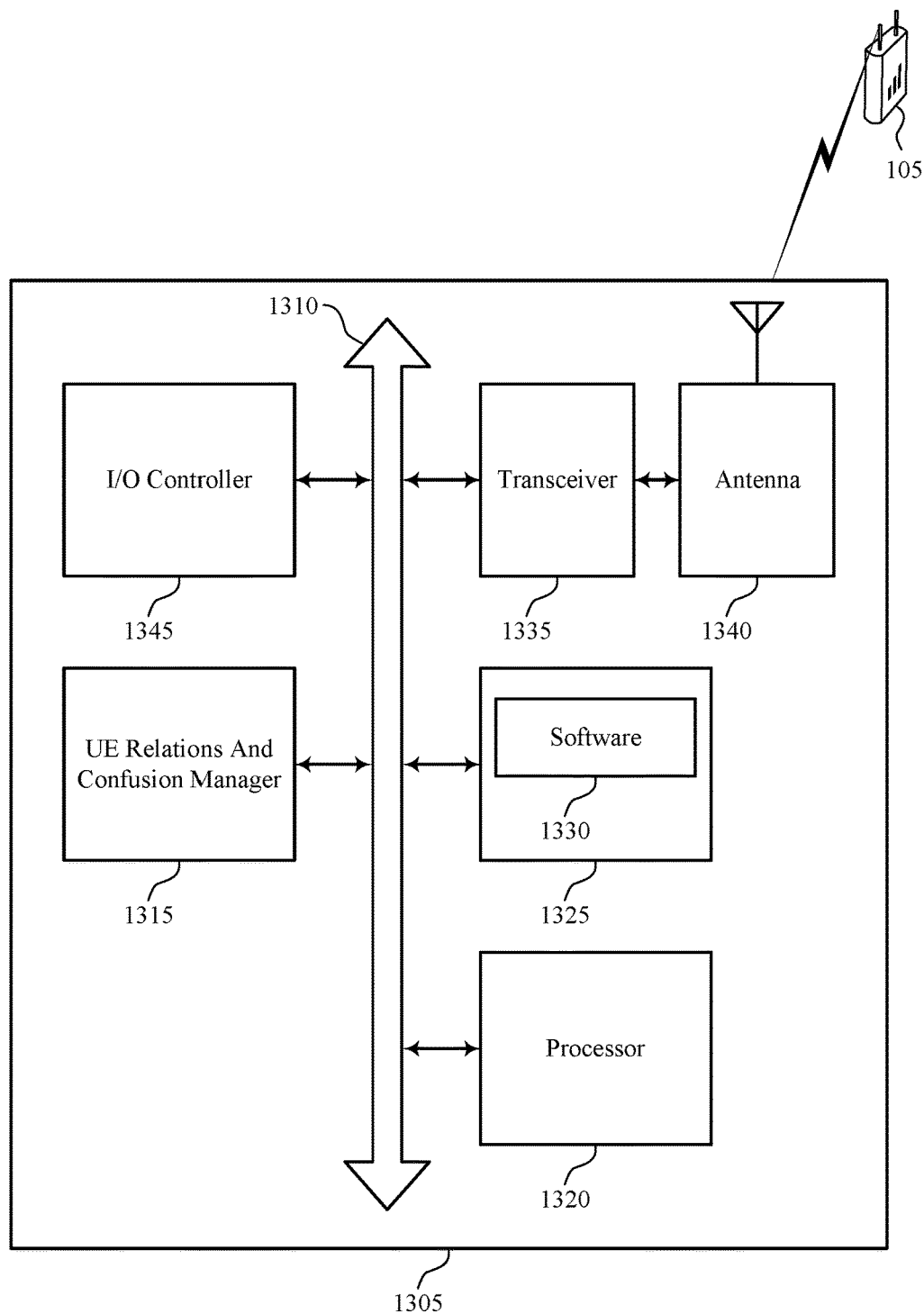
FIG. 13 illustrates a block diagram of a system including a UE that supports enhanced neighbor relations and PCI confusion detection in accordance with various aspects of the present disclosure.

FIG. 13 shows a diagram of a system 1300 including a device 1305 that supports enhanced neighbor relations and PCI confusion detection in accordance with various aspects of the present disclosure. Device 1305 may be an example of or include the components of a UE 115 as described above, e.g., with reference to FIGS. 1 through 5 and 10 through 12.

Device 1305 may include components for bi-directional voice and data communications including components for transmitting and receiving communications, including UE relations and confusion manager 1315, processor 1320, memory 1325, software 1330, transceiver 1335, antenna 1340, and I/O controller 1345.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting enhanced neighbor relations and PCI confusion detection). 1320.

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support enhanced neighbor relations and PCI confusion detection. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
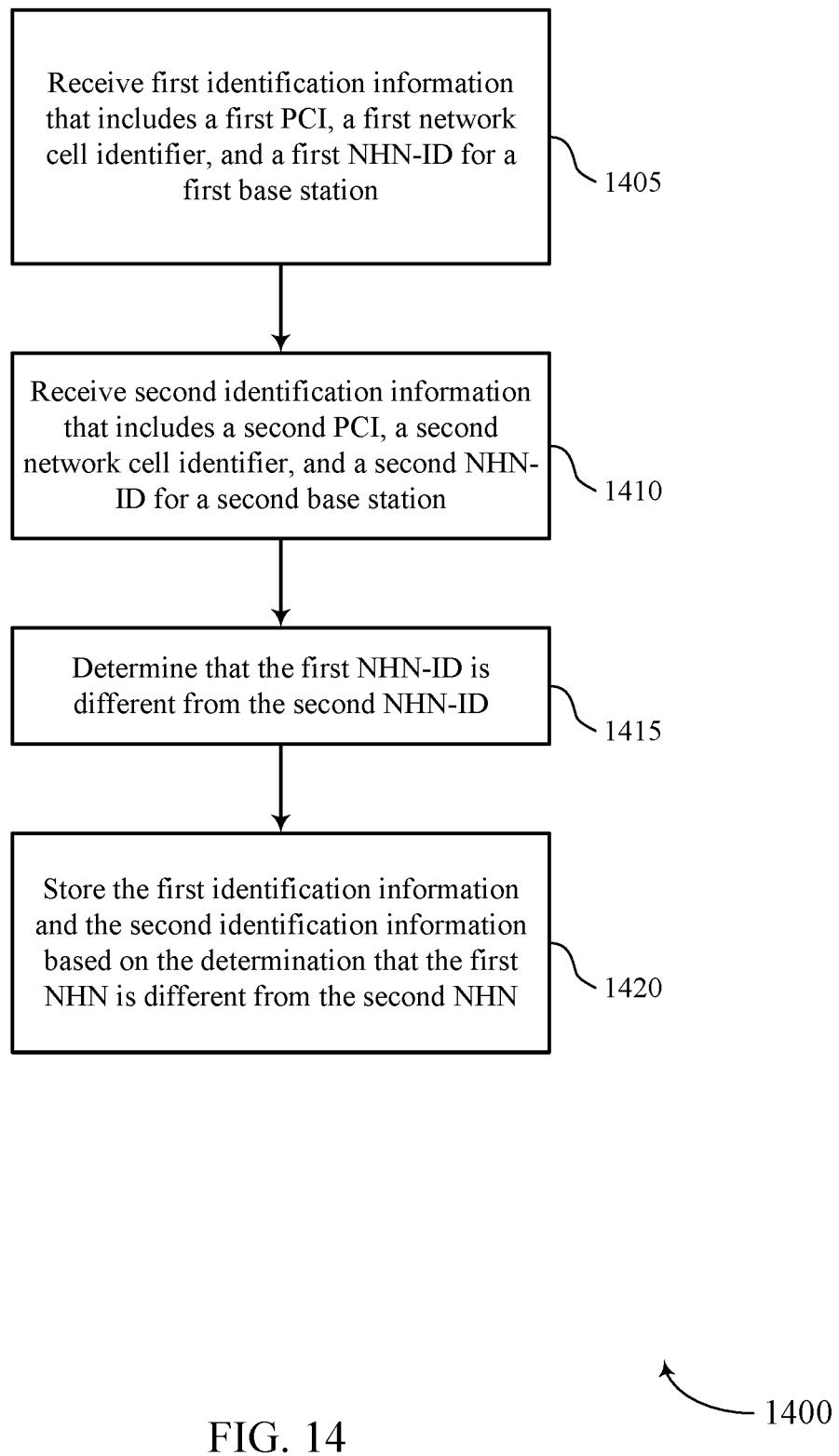
FIGS. 14 through 17 illustrate methods for enhanced neighbor relations and PCI confusion detection in accordance with various aspects of the present disclosure.

FIG. 14 shows a flowchart illustrating a method 1400 for enhanced neighbor relations and PCI confusion detection in accordance with various aspects of the present disclosure. The operations of method 1400 may be implemented by a base station 105 or its components as described herein. For example, the operations of method 1400 may be performed by a base station relations and confusion manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware.

At block 1405, the base station 105 may receive first identification information that includes a first PCI, a first network cell identifier, and a first NHN-ID for a first base station. The operations of block 1405 may be performed according to the methods described with reference to FIGS. 1 through 5. In certain examples, aspects of the operations of block 1405 may be performed by an identification component as described with reference to FIGS. 6 through 9.

At block 1410, the base station 105 may receive second identification information that includes a second PCI, a second network cell identifier, and a second NHN-ID for a second base station. The operations of block 1410 may be performed according to the methods described with reference to FIGS. 1 through 5. In certain examples, aspects of the operations of block 1410 may be performed by an identification component as described with reference to FIGS. 6 through 9.

At block 1415, the base station 105 may determine that the first NHN-ID is different from the second NHN-ID. The operations of block 1415 may be performed according to the methods described with reference to FIGS. 1 through 5. In certain examples, aspects of the operations of block 1415 may be performed by a network determination component as described with reference to FIGS. 6 through 9.

At block 1420, the base station 105 may store the first identification information and the second identification information based on the determination that the first NHN is different from the second NHN. The operations of block 1420 may be performed according to the methods described with reference to FIGS. 1 through 5. In certain examples, aspects of the operations of block 1420 may be performed by an information storing component as described with reference to FIGS. 6 through 9.

Figure 15:
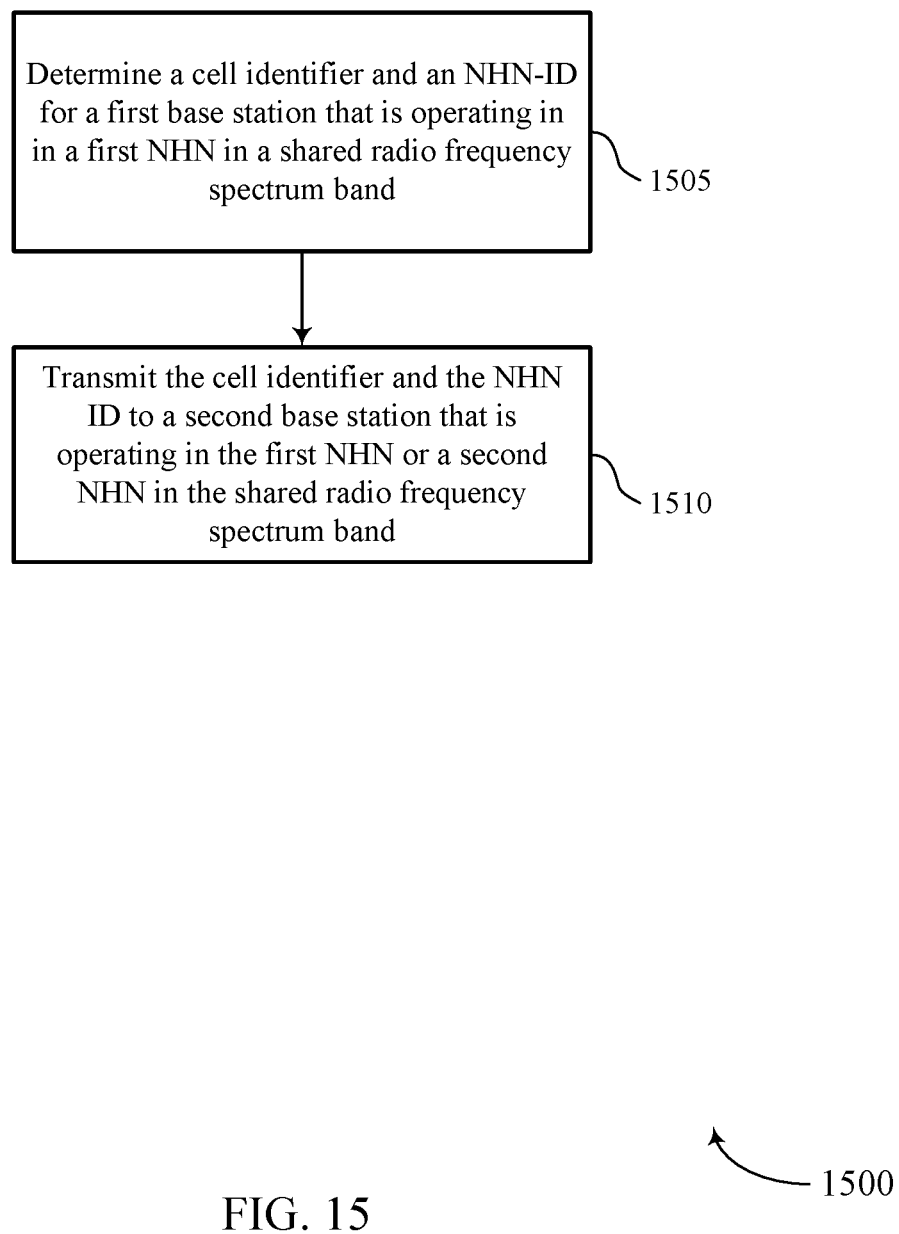

FIG. 15 shows a flowchart illustrating a method 1500 for enhanced neighbor relations and PCI confusion detection in accordance with various aspects of the present disclosure. The operations of method 1500 may be implemented by a UE 115 or its components as described herein. For example, the operations of method 1500 may be performed by a UE relations and confusion manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 1505, the UE 115 may determine a cell identifier and a NHN-ID for a first base station that is operating in a first NHN in a shared radio frequency spectrum band. The operations of block 1505 may be performed according to the methods described with reference to FIGS. 1 through 5. In certain examples, aspects of the operations of block 1505 may be performed by an identifier determination component as described with reference to FIGS. 10 through 13.

At block 1510, the UE 115 may transmit the cell identifier and the NHN ID to a second base station that is operating in the first NHN or a second NHN in the shared radio frequency spectrum band. The operations of block 1510 may be performed according to the methods described with reference to FIGS. 1 through 5. In certain examples, aspects of the operations of block 1510 may be performed by a transmission component as described with reference to FIGS. 10 through 13.

Figure 16:
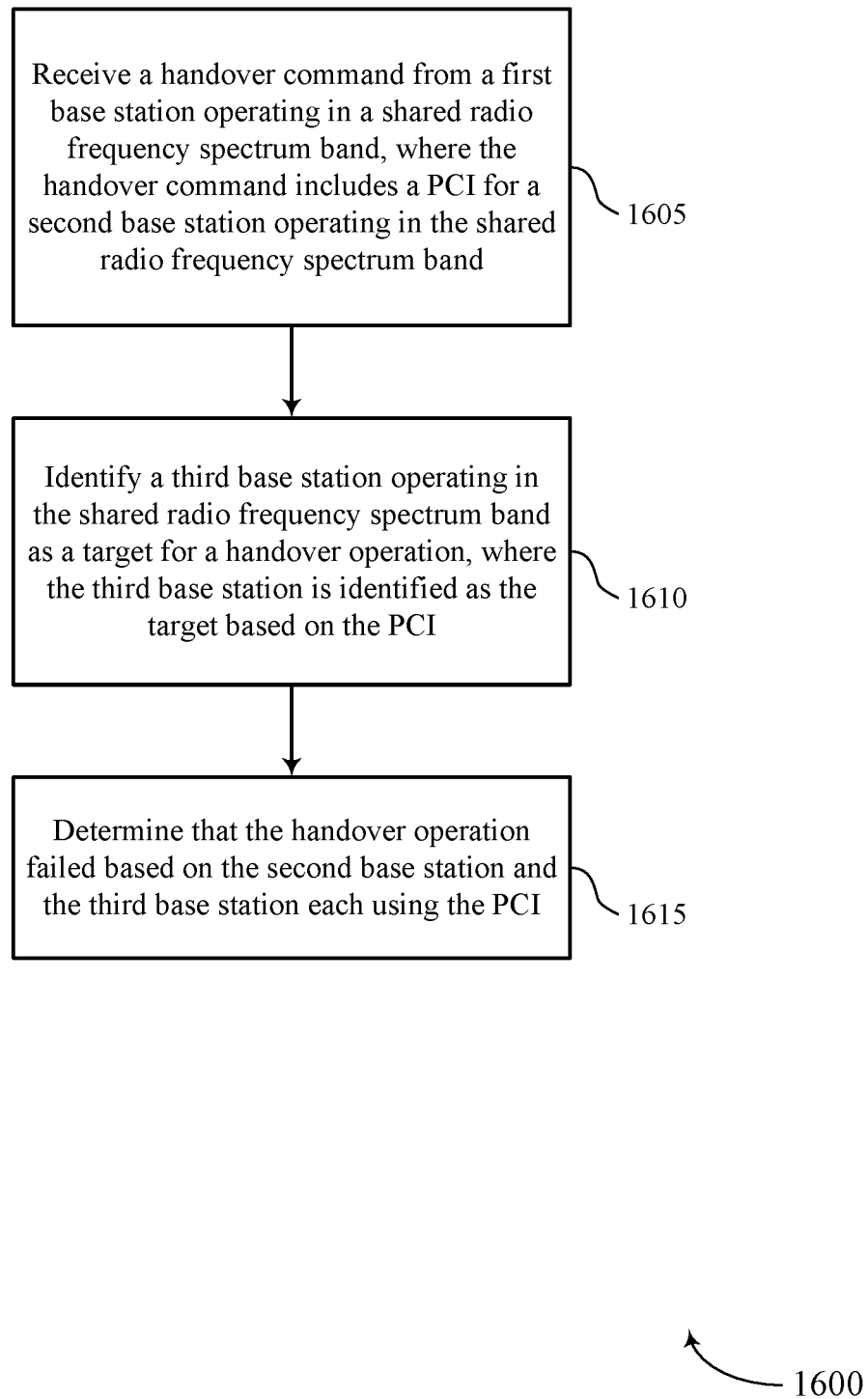

FIG. 16 shows a flowchart illustrating a method 1600 for enhanced neighbor relations and PCI confusion detection in accordance with various aspects of the present disclosure. The operations of method 1600 may be implemented by a UE 115 or its components as described herein. For example, the operations of method 1600 may be performed by a UE relations and confusion manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 1605, the UE 115 may receive a HO command from a first base station operating in a shared radio frequency spectrum band, where the HO command includes a PCI for a second base station operating in the shared radio frequency spectrum band. The operations of block 1605 may be performed according to the methods described with reference to FIGS. 1 through 5. In certain examples, aspects of the operations of block 1605 may be performed by a HO command component as described with reference to FIGS. 10 through 13.

At block 1610, the UE 115 may identify a third base station operating in the shared radio frequency spectrum band as a target for a HO operation, where the third base station is identified as the target based on the PCI. The operations of block 1610 may be performed according to the methods described with reference to FIGS. 1 through 5. In certain examples, aspects of the operations of block 1610 may be performed by a HO target component as described with reference to FIGS. 10 through 13.

At block 1615, the UE 115 may determine that the HO operation failed based on the second base station and the third base station each using the PCI. The operations of block 1615 may be performed according to the methods described with reference to FIGS. 1 through 5. In certain examples, aspects of the operations of block 1615 may be performed by a HO operation component as described with reference to FIGS. 10 through 13.

Figure 17:
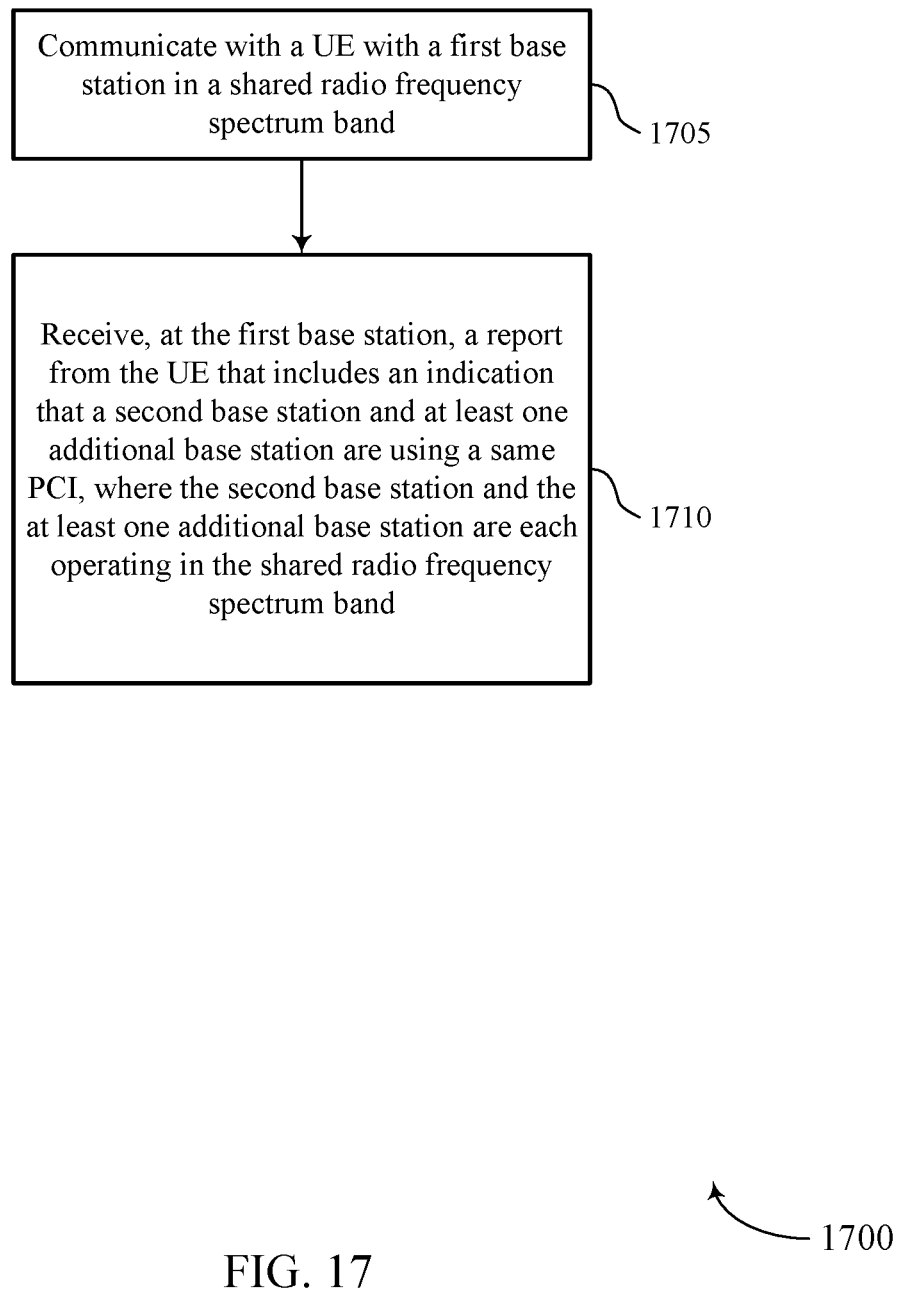

FIG. 17 shows a flowchart illustrating a method 1700 for enhanced neighbor relations and PCI confusion detection in accordance with various aspects of the present disclosure. The operations of method 1700 may be implemented by a base station 105 or its components as described herein. For example, the operations of method 1700 may be performed by a base station relations and confusion manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware.

At block 1705, the base station 105 may communicate with a UE with a first base station in a shared radio frequency spectrum band. The operations of block 1705 may be performed according to the methods described with reference to FIGS. 1 through 5. In certain examples, aspects of the operations of block 1705 may be performed by a communication component as described with reference to FIGS. 6 through 9.

At block 1710, the base station 105 may receive, at the first base station, a report from the UE that includes an indication that a second base station and at least one additional base station are using a same PCI, where the second base station and the at least one additional base station are each operating in the shared radio frequency spectrum band. The operations of block 1710 may be performed according to the methods described with reference to FIGS. 1 through 5. In certain examples, aspects of the operations of block 1710 may be performed by a receiver as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), a request to report information associated with one or more cell identifiers;
determining at least one cell identifier and a neutral host network (NHN) identifier (NHN-ID) associated with the one or more cell identifiers to be included in an identification information report for a first base station that is operating in a first NHN in a shared radio frequency spectrum band, wherein the at least one cell identifier comprises an Evolved Universal Terrestrial Access Network (E-UTRAN) cell global identifier (ECGI) or a physical cell identifier (PCI) for the first base station, and wherein the NHN-ID comprises information relating to the first NHN; and
transmitting, in response to the request, the identification information report including the at least one cell identifier and the NHN ID associated with the one or more cell identifiers to a second base station that is operating in the first NHN or a second NHN in the shared radio frequency spectrum band.

2. The method of claim 1, wherein:
the one or more cell identifiers comprises the PCI, wherein transmitting the identification information report including the at least one cell identifier and the NHN ID is based at least in part on the request.

3. The method of claim 2, wherein:
the request comprises a list of known cell identifiers for one or more base stations.

4. The method of claim 2, wherein:
the request comprises an indication to report newly detected cell identifiers.

5. The method of claim 2, further comprising:
transmitting one or both of the ECGI or the PCI for the first base station in response to the request.

6. The method of claim 1, further comprising:
identifying a radio access technology (RAT) used by the first base station; and
transmitting an indication of the RAT used by the first base station to the second base station.

7. An apparatus for wireless communication, comprising:
means for receiving, at a user equipment (UE), a request to report information associated with one or more cell identifiers;
means for determining at least one cell identifier and a neutral host network (NHN) identifier (NHN-ID) associated with the one or more cell identifiers to be included in an identification information report for a first base station that is operating in a first NHN in a shared radio frequency spectrum band, wherein the at least one cell identifier comprises an Evolved Universal Terrestrial Access Network (E-UTRAN) cell global identifier (ECGI) or a physical cell identifier (PCI) for the first base station, and wherein the NHN-ID comprises information relating to the first NHN; and
means for transmitting, in response to the request, the identification information report including the at least one cell identifier and the NHN ID associated with the one or more cell identifiers to a second base station that is operating in the first NHN or a second NHN in the shared radio frequency spectrum band.

8. The apparatus of claim 7, wherein:
the one or more cell identifiers comprises the PCI, wherein the means for transmitting the identification information report including the at least one cell identifier and the NHN ID is based at least in part on the request.

9. The apparatus of claim 8, wherein the means for transmitting the identification information report including the at least one cell identifier further comprises:
means for transmitting one or both of the ECGI or the PCI for the first base station in response to the request.

10. The apparatus of claim 8, wherein:
the request comprises a list of known cell identifiers for one or more base stations.

11. The apparatus of claim 7, further comprising:
means for identifying a radio access technology (RAT) used by the first base station; and
means for transmitting an indication of the RAT used by the first base station to the second base station.

12. An apparatus for wireless communication, in a system comprising:
a processor;
memory in electronic communication with the processor; and
instructions stored in the memory and operable, when executed by the processor, to cause the apparatus to:
receive, at a user equipment (UE), a request to report information associated with one or more cell identifiers;
determine at least one cell identifier and a neutral host network (NHN) identifier (NHN-ID) associated with the one or more cell identifiers to be included in an identification information report for a first base station that is operating in a first NHN in a shared radio frequency spectrum band, wherein the at least one cell identifier comprises an Evolved Universal Terrestrial Access Network (E-UTRAN) cell global identifier (ECGI) or a physical cell identifier (PCI) for the first base station, and wherein the NHN-ID comprises information relating to the first NHN; and
transmit, in response to the request, the identification information report including the at least one cell identifier and the NHN ID associated with the one or more cell identifiers to a second base station that is operating in the first NHN or a second NHN in the shared radio frequency spectrum band.

13. The apparatus of claim 12, wherein
the one or more cell identifiers comprises the PCI, wherein transmitting the identification information report including the at least one cell identifier and the NHN ID is based at least in part on the request.

14. The apparatus of claim 13, wherein the instructions are further executable by the processor to:
transmit one or both of the ECGI or the PCI for the first base station in response to the request.

15. The apparatus of claim 13, wherein:
the request comprises a list of known cell identifiers for one or more base stations.

16. The apparatus of claim 13, wherein:
the request comprises an indication to report newly detected cell identifiers.

17. The apparatus of claim 12, wherein the instructions are further executable by the processor to:
identify a radio access technology (RAT) used by the first base station; and
transmit an indication of the RAT used by the first base station to the second base station.

18. A non-transitory computer readable medium storing code for wireless communication, the code comprising instructions executable by a processor to:
receive, at a user equipment (UE), a request to report information associated with one or more cell identifiers;
determine at least one cell identifier and a neutral host network (NHN) identifier (NHN-ID) associated with the one or more cell identifiers to be included in an identification information report for a first base station that is operating in a first NHN in a shared radio frequency spectrum band, wherein the at least one cell identifier comprises an Evolved Universal Terrestrial Access Network (E-UTRAN) cell global identifier (ECGI) or a physical cell identifier (PCI) for the first base station, and wherein the NHN-ID comprises information relating to the first NHN; and
transmit, in response to the request, the identification information report including the at least one cell identifier and the NHN ID associated with the one or more cell identifiers to a second base station that is operating in the first NHN or a second NHN in the shared radio frequency spectrum band.

19. The non-transitory computer-readable medium of claim 18, wherein
the one or more cell identifiers comprises the PCI, wherein transmitting the identification information report including the at least one cell identifier and the NHN ID is based at least in part on the request.

20. The non-transitory computer-readable medium of claim 19, wherein the instructions are further executable by the processor to:
transmit one or both of the ECGI or the PCI for the first base station in response to the request.

21. The non-transitory computer-readable medium of claim 19, wherein:
the request comprises a list of known cell identifiers for one or more base stations.

22. The non-transitory computer-readable medium of claim 18, wherein the instructions are further executable by the processor to:
identify a radio access technology (RAT) used by the first base station; and
transmit an indication of the RAT used by the first base station to the second base station.

23. A method for wireless communication, comprising:
determining at least one cell identifier and a neutral host network (NHN) identifier (NHN-ID) associated with one or more cell identifiers to be included in an identification information report for a first base station that is operating in a first NHN in a shared radio frequency spectrum band, wherein the at least one cell identifier comprises an Evolved Universal Terrestrial Access Network (E-UTRAN) cell global identifier (ECGI) or a physical cell identifier (PCI) for the first base station, and wherein the NHN-ID comprises information relating to the first NHN; and
transmitting, by the first base station, the identification information report including the at least one cell identifier and the NHN ID associated with the one or more cell identifiers to a second base station that is operating in the first NHN or a second NHN in the shared radio frequency spectrum band.

* * * * *